(12) United States Patent
Jinupun

(10) Patent No.: US 6,781,273 B2
(45) Date of Patent: Aug. 24, 2004

(54) MULTI-CIRCULAR FLUX MOTOR

(76) Inventor: Poramaste Jinupun, 18 Tomsfield Rd, Hatfield, Hertfordshire AL10 9TB (GB)

( * ) Notice: Subject to any disclaimer, the term of this patent is extended or adjusted under 35 U.S.C. 154(b) by 6 days.

(21) Appl. No.: 09/804,792

(22) Filed: Mar. 14, 2001

(65) Prior Publication Data

US 2002/0030416 A1 Mar. 14, 2002

(30) Foreign Application Priority Data

Sep. 14, 2000 (GB) .............................................. 0022600

(51) Int. Cl.[7] .......................... H02K 17/00; H02K 1/00; H02K 3/00
(52) U.S. Cl. ........................ 310/168; 310/184; 310/187
(58) Field of Search ............................ 310/12–13, 180, 310/184, 185, 187, 168, 254, 216

(56) References Cited

U.S. PATENT DOCUMENTS

| | | | | |
|---|---|---|---|---|
| 3,878,415 A | * | 4/1975 | Wesolowski | 310/184 |
| 4,035,680 A | * | 7/1977 | Maeder | 310/168 |
| 4,757,224 A | * | 7/1988 | McGee et al. | 310/168 |
| 4,883,999 A | * | 11/1989 | Hendershot | 310/254 |
| 5,866,964 A | * | 2/1999 | Li | 310/198 |
| 6,025,668 A | * | 2/2000 | Kolomeitsev | 310/187 |
| 6,369,481 B1 | * | 4/2002 | Bahn | 310/166 |

* cited by examiner

*Primary Examiner*—Tran Nguyen

(57) ABSTRACT

An invention is a new type of motor, a multi-circular flux motor. The invention has simple structure and comprises of a salient pole rotor and the silent pole stator. The stator pole is subdivided into plural teeth with the individual winding. A group of windings of each stator pole is connected in either series or parallel and is driven by one excitation phase. The movement of the invention uses multi-circular flux loops to produce reluctance torque to make the rotor moves. The multi-circular flux loops comprise of a series of flux loops that every flux loop is inversely rotation direction to each other adjacent. The invention can apply in a linear and rotating machine. By having plural winding poles and phases, the invention can be a poly-phase machine. The invention can be designed to be any number of poles and phases because all flux loops are separated. The invention is applied in both AC and DC machine and both linear and rotating machine. The rotor core can be replaced with a lightweight material or hollowed out to be a lightweight rotor. The invention can be designed to be a toothless-stator or toothless-rotor machine.

27 Claims, 23 Drawing Sheets

Figure 3:
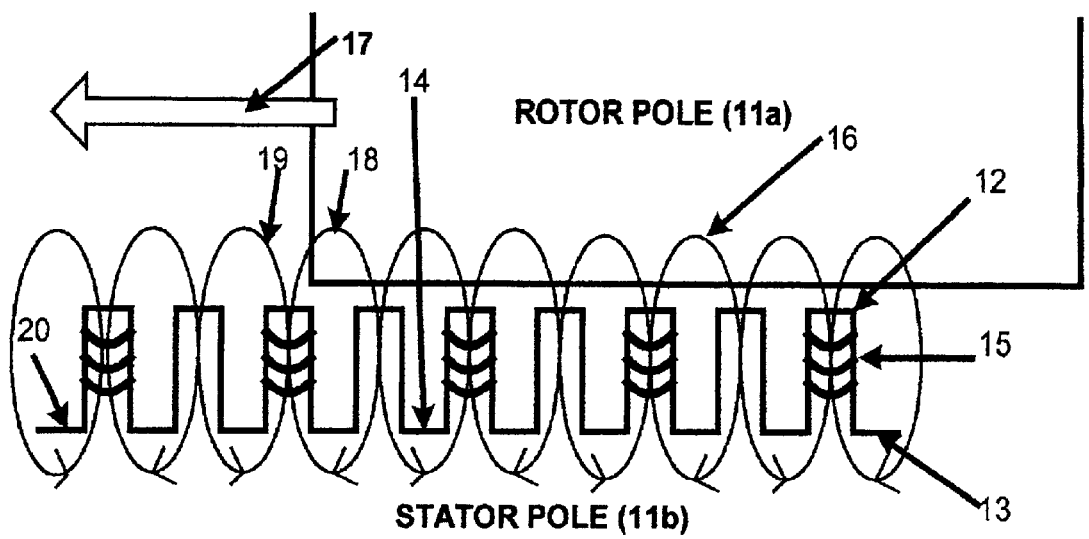

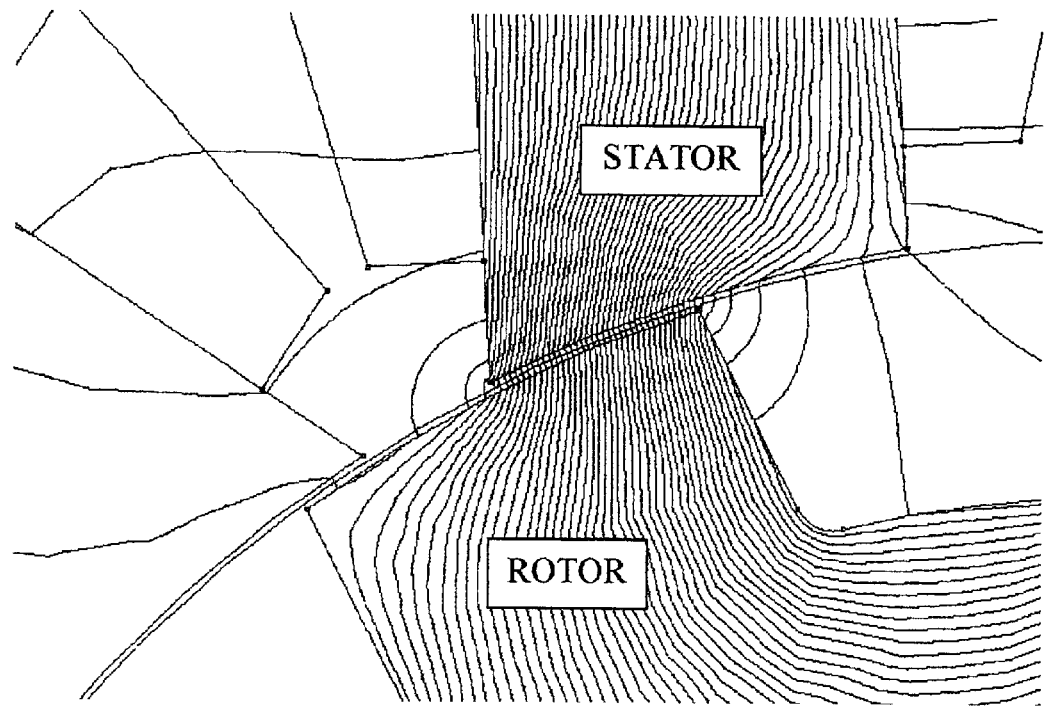
Fig.1 A flux density of one phase excitation (Prior Art)
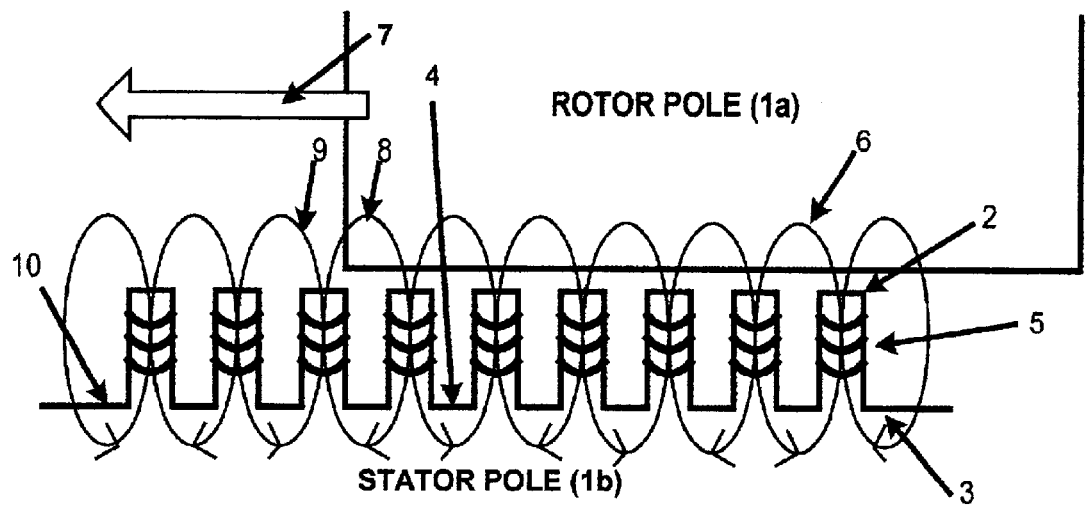
Fig.2

- first row is phase C
- second row is phas B
- third row is phase A

- first row is phase C
- second row is phas B
- third row is phase A

- first row is phase C
- second row is phas B
- third row is phase A

- first row is phase C
- second row is phas B
- third row is phase A

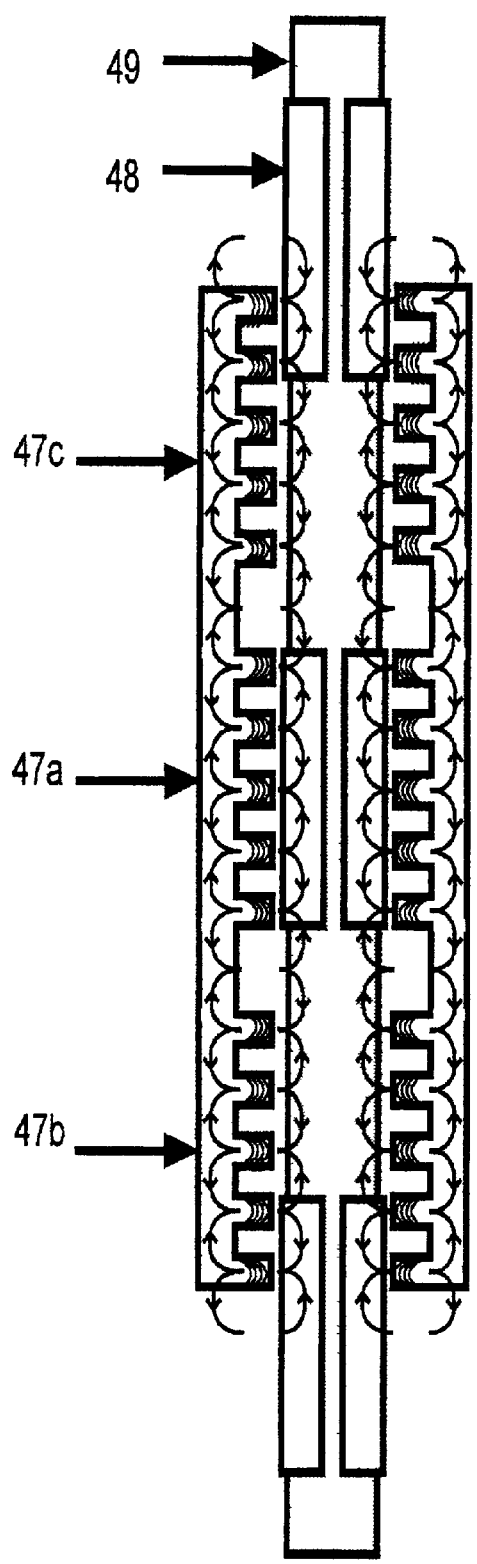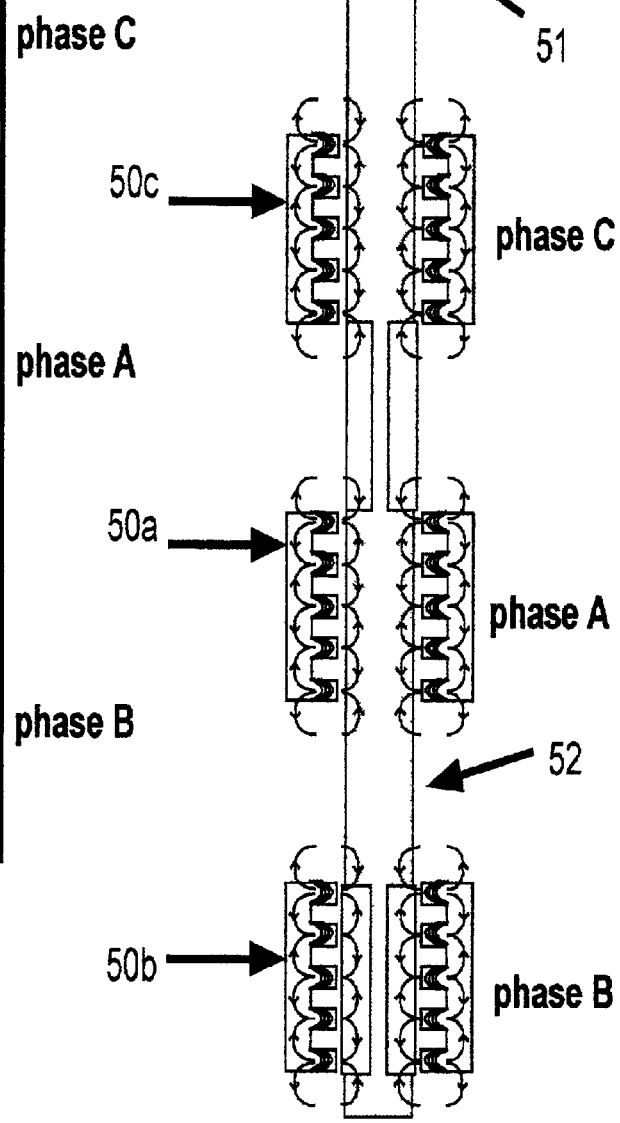
Fig.11a
Fig.11b

MULTI-CIRCULAR FLUX MOTOR

FIELD OF THE INVENTION

The invention related to a reluctance motor with a silent pole rotor and stator having winding on either a rotor pole or a stator pole. The invention is a new type of machine in its class because it uses the new technique, multi-circular flux loops (a series of flux loop or a series of circular flux loops), to produce reluctance torque. The invention can implement in alternating current (AC) and direct current (DC) pulse. The invention can apply with a simultaneous phase excitation without flux cancellation between phases. The invention has no a permanent magnet on both a rotor pole and a stator pole, has a simple salient pole and has no physical commutation but commutates by means of electronically commutation.

BACKGROUND OF INVENTION

The invention is built up by using the principle of reluctance torque. This invention can be named 'a multi-circular flux motor' the background of the technique came from a short flux loop of a reluctance machine especially a switched reluctance motor. By mean of the short flux loop the electromagnetic flux can be an individual from other flux loops or other phases and a core loss of the machine reduces. As an individual electromagnetic flux loop the motor can be constructed as a servo-machine. However, the short flux loop machine such as a 12/10 pole switched reluctance motor (see invention U.S. Pat. No. 4,883,999) has limitation of designs. The motor cannot have a low number of poles, therefore the motor has to use with a very high frequency to achieve a high speed (the 12/10 switched reluctance motor use 60 Hz to achieve 360 rpm while a 2-pole induction motor use 60 Hz to achieve 3600 rpm). Switched reluctance motor structures are difficult to apply in an AC machine unlike synchronous reluctance motors that can apply in AC machine except just they have a complex rotor which difficult to build.

The benefits over having an AC machine application are:

Using only two current sensors measure 3-phase current.
The machine runs twice times faster than using the DC pulse, for example 50 Hz AC machine run at actual 100 Hz compare to the DC pulse machine such as a switched reluctance motor, because the AC machine is a bipolar current machine while a DC pulse machine is a unipolar current machine.
Using a sinusoidal signal gets a low harmonic.

The principle of this invention can be applied in a linear motor, a rotating machine and a moving part machine. From the prior art shown in FIG. 1, a switched reluctance motor tooth shows flux density on both a stator and rotor tooth, the flux density thereby aligned teeth is very condensed than other area and having uneven of saturation level. Conventional switched reluctance motors are usually work by a long flux loop with a fully aligned and fully unaligned condition of their big tooth makes very hard to configure the motor structure. For example a 6/4 pole 3-phase cannot driven by a simultaneous 3-phase excitation and is not appropriate to use an alternating current with their structure. Although some of a switched reluctance motors work by a short flux loop and might be possible to drive by a simultaneous 3-phase excitation but its configuration makes the machine have many teeth. For example, the 12/10 poles 3-phase (see invention U.S. Pat. No. 4,883,999) and a characteristic of the motor type are a highly non-linear, therefore the potential of high-speed application is limited by core loss, switching loss and low inductance ratio making a low torque output and very difficult to control by the problem of a non-linear characteristic of the motor.

SUMMARY OF THE INVENTION

The invention has shared a theory to prior art in a term of reluctance torque between teeth except a winding pole of the invention has been subdivided into plural teeth and work together by a group of short flux loops. A short flux loop that use in a switched reluctance machine, its stroke angle or step distance depends on a tooth width. The way of the invention a winding tooth width can be small as need without an effect to its stroke angle or step distance. The resolution of rotation or linear movement does not depend on the winding tooth width but depends on the winding pole width. This very importance feature makes the invention unique from a conventional short flux loop in a switched reluctance machine. Subdivided teeth with windings of the invention together perform the function as one big winding pole. The invention is not an alignment of teeth but is an alignment of poles, using individual flux loop of those subdivided teeth makes an isolation of each pole and each phase independently therefore the invention can be constructed to be a new type of a machine. By means of using a subdivided tooth, a pole space between phases can be reduced as the tooth space, the invention have a high inductance ratio and the rotor core can use a lightweight material to make a low inertia rotor therefore the invention can be designed to a new type of a machine by its own ways.

The Invention Principle can be Described by the Following:

The invention comprised of a salient pole rotor and a salient pole stator. The rotor pole width is about the stator pole width. Each stator pole (a winding pole) is subdivided into plural stator teeth. All windings of the plural stator teeth of each stator pole are connected together to be one phase winding. The phase winding of each stator pole is excited to perform electromagnetic poles. All odd stator teeth of each stator pole are either North poles or South poles. All even stator teeth of each stator pole are either North poles or South poles. The electromagnetic poles of the odd stator teeth and the even stator teeth are opposite. Each stator tooth generates linking flux loops to both adjacent teeth to complete its electromagnetic flux loops. The both adjacent teeth are a right-hand adjacent tooth and a left-hand adjacent tooth. The electromagnetic flux loops of the stator tooth consist of a left-hand linking flux loop and a right-hand linking flux loop. The left-hand linking flux loop is either a left or right rotation direction. The right-hand linking flux loop is either a left or right rotation direction. The left-hand linking flux loop of the odd stator teeth and the right-hand linking flux loop of the even stator teeth are the same rotation direction. The right-hand linking flux loop of the odd teeth and the left-hand linking flux of the even teeth are the same rotation direction. The linking flux loops are joined together as a series of flux loops or a series of circular flux loops (multi-circular flux loops). The flux loop where a rotor pole-corner is aligned with the stator pole produces reluctance torque to rotate or move the rotor pole, then the next flux loop where the rotor pole-corner is increasingly aligned with the stator pole produces reluctance torque to continue rotate or move until the rotor pole is fully aligned with the stator pole. A stroke angle or a step distance does depend on the stator pole width but does not depend on the small stator teeth.

*Note: the circular flux loop is, [the flux loop] or [the left-hand linking flux loop of odd tooth + the right-hand linking flux loop of even tooth] while the multi-circular flux loops are a series of circular flux loops or a series of flux loops.

Figure 4:
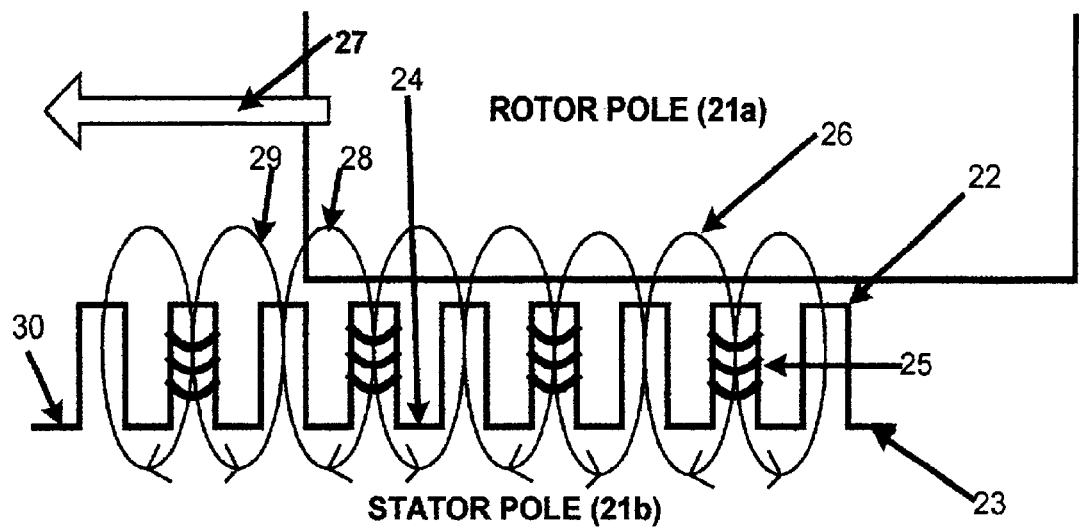

The invention using a method of the multi-circular flux loops to produce reluctance torque can be explained in simple drawings shown in FIG. 2, FIG. 3 and FIG. 4

The operation of the simple invention shown in FIG. 2 comprised with the nonpermanent magnet rotor pole (1a), the non-permanent magnet stator pole (1b), subdivided teeth (2) with windings (5), tooth spaces (4) and stator pole-ends (3, 10). Every tooth of the stator pole is wound, wound inversely to each other adjacent and all are connected together in either a series or a parallel to be one phase winding. The windings are excited to generate the circular flux loop (6) inversely rotation direction to each other adjacent. The most effective circular flux loop (8) produces reluctance torque to complete its electromagnetic flux loop, then the next circular flux loop (9) becomes the most effective circular flux loop and repeats the same operation to make rotor pole move to direction (7) until the end of the stator pole (10) the rotor pole (1a) stops movement. The rotor pole width is about a stator pole width from the pole-end (3) to (10) and can be extended about a half of tooth width of the stator pole to make a smooth movement between poles (in poly-phase case).

The operation of the simple invention shown in FIG. 3 comprised with the nonpermanent magnet rotor pole (11a), the non-permanent magnet stator pole (11b), subdivided teeth (12) with windings (15), tooth spaces (14) and stator pole-ends (20, 13). Every odd tooth of the stator pole is wound, wound in the same direction and all are connected together in either a series or a parallel to be one phase winding. The windings are excited to generate a circular flux loop (16) inversely rotation direction to each other adjacent. The most effective circular flux loop (18) produces reluctance torque to complete its electromagnetic flux loop, then the next circular flux loop (19) becomes the most effective circular flux loop and repeats the same operation to make a rotor pole move to direction (17) until the end of stator pole (20) the rotor pole (11a) stops movement. The rotor pole width is about a stator pole width from pole-end (13) to (20) and can be extended about a half of tooth width of a stator pole to make a smooth movement between poles (in poly-phase case).

The operation of the simple invention shown in FIG. 4, comprised with the nonpermanent magnet rotor pole (21a), the non-permanent magnet stator pole (21b), subdivided teeth (22) and windings (25), tooth spaces (24) and stator pole-ends (23, 30). Every even tooth of the stator pole is wound, wound in the same direction and all are connected together in either a series or a parallel to be one phase winding. The windings are excited to generate a circular flux loop (26) inversely rotation direction to each other adjacent. The most effective circular flux loop (28) produces reluctance torque to complete its electromagnetic flux loop, then the next circular flux loop (29) becomes the most effective circular flux loop and repeats the same operation to make a rotor pole move to direction (27) until the end of a stator pole (30) the rotor pole (21a) stops movement. The rotor pole width is about a stator pole width from a pole-end (23) to (30) and can be extended about a half of tooth width of a stator pole to make a smooth movement between poles (in poly-phase case).

The connection of the windings of the winding pole can be either a parallel or series and depends on particular design.

The series connection, an inductance and a flux-linkage profile is increasing by linear make ease of finding rotor position. The series connection not only good for ease of finding rotor position but also good for having a constant torque by a constant current control through the series of windings. The disadvantage of the series connection is using a high voltage source.

The parallel connection, an inductance and a flux-linkage profile also are increasing by linear but it has a low scale changing make difficult of finding rotor position. This connection suits for a high inductance application that use lower voltage source than the series connection however in a normal circumstance, the series connection is more suitable than parallel connection.

Finding rotor position of the invention is not difficult even in saturation mode because all aligned teeth have similar level of saturation while the remained unaligned teeth have a higher inductance ratio than all aligned teeth.

Figure 5:
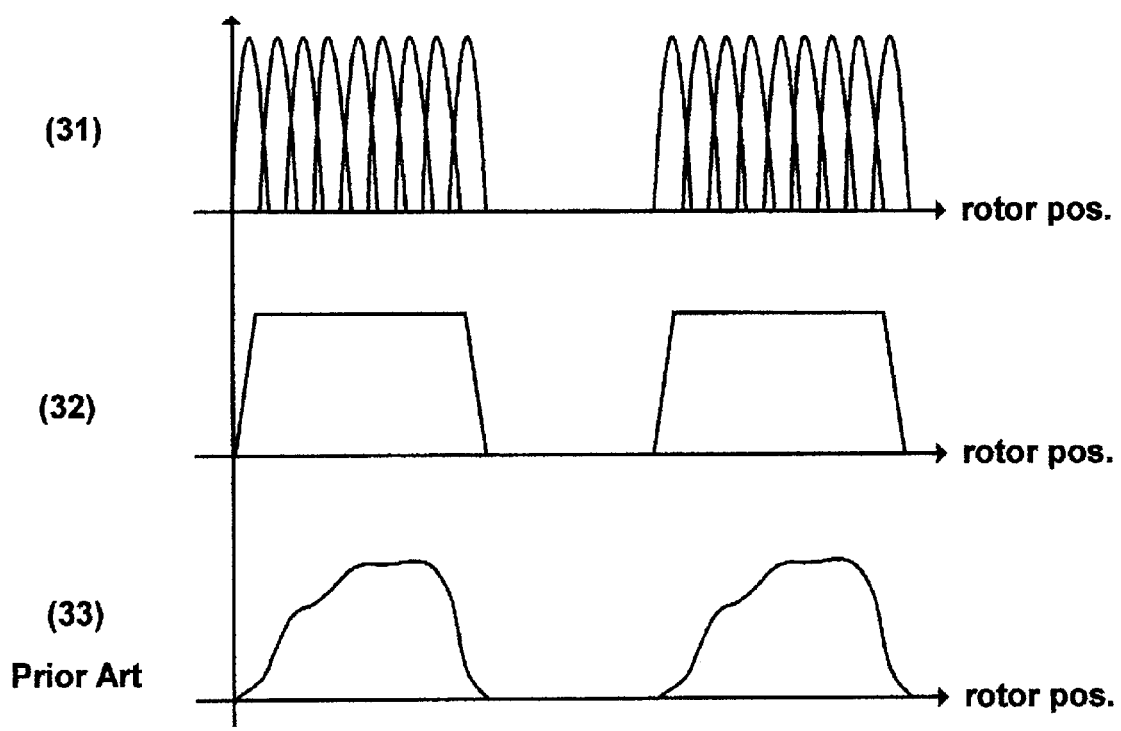

The invention has lower torque ripple than a conventional reluctance machine by the ways of a continuing toque of plural teeth (31) of one phase as shown in FIG. 5 therefore the machine rotates or moves smoothly (32) and is suitable for servo controls. Unlike a conventional switched reluctance motor teeth is too wide a characteristic of torque is vary by position, as a result every alignment position has its own characteristic (33), which is non-linear.

The ways of having inverse flux rotation direction to each other adjacent can be done in two ways, first way every tooth of stator pole is wound inversely direction to each other adjacent and second way every tooth is wound in the same direction and every winding terminal is inverted polarity to each other adjacent.

Increasing the rotor pole width about a half of tooth width of the stator pole makes a smooth rotation or movement between poles by the mutual flux (34 and 35 in FIG. 6a and FIG. 6b, respectively) and by overlapping the phase excitation between two phases produces a low torque ripple.

The invention has no required a large pole space for the winding pole therefore the way of motor or machine design by the invention technique is different from a switch reluctance motor. A switched reluctance motor requires a large pole space for the winding pole to make unaligned condition while the invention needs just only a subdivided tooth space to make unaligned condition therefore the adjacent winding pole of other phases can place next to with a subdivided tooth space in between.

Figure 12:
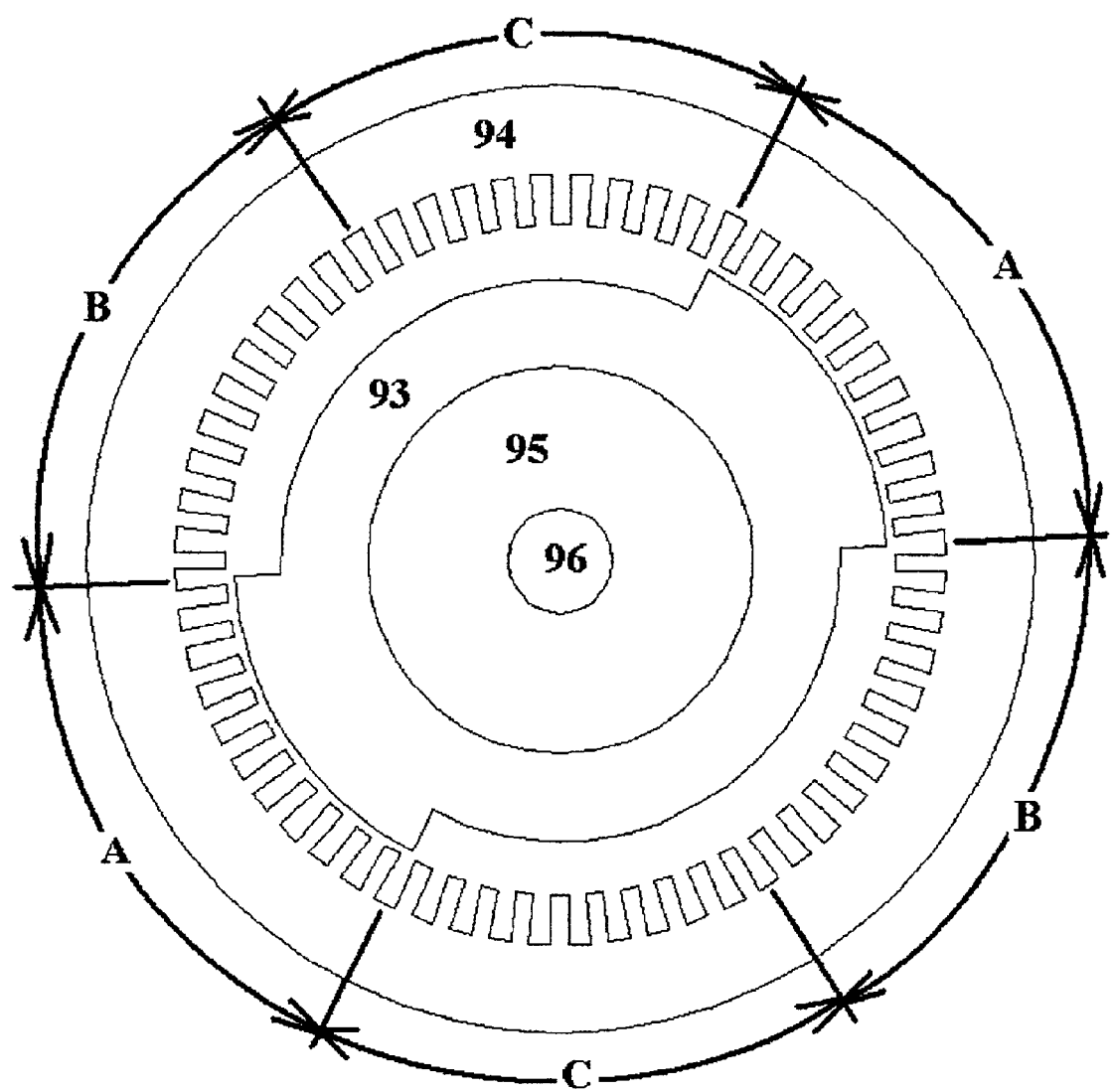
Figure 13:
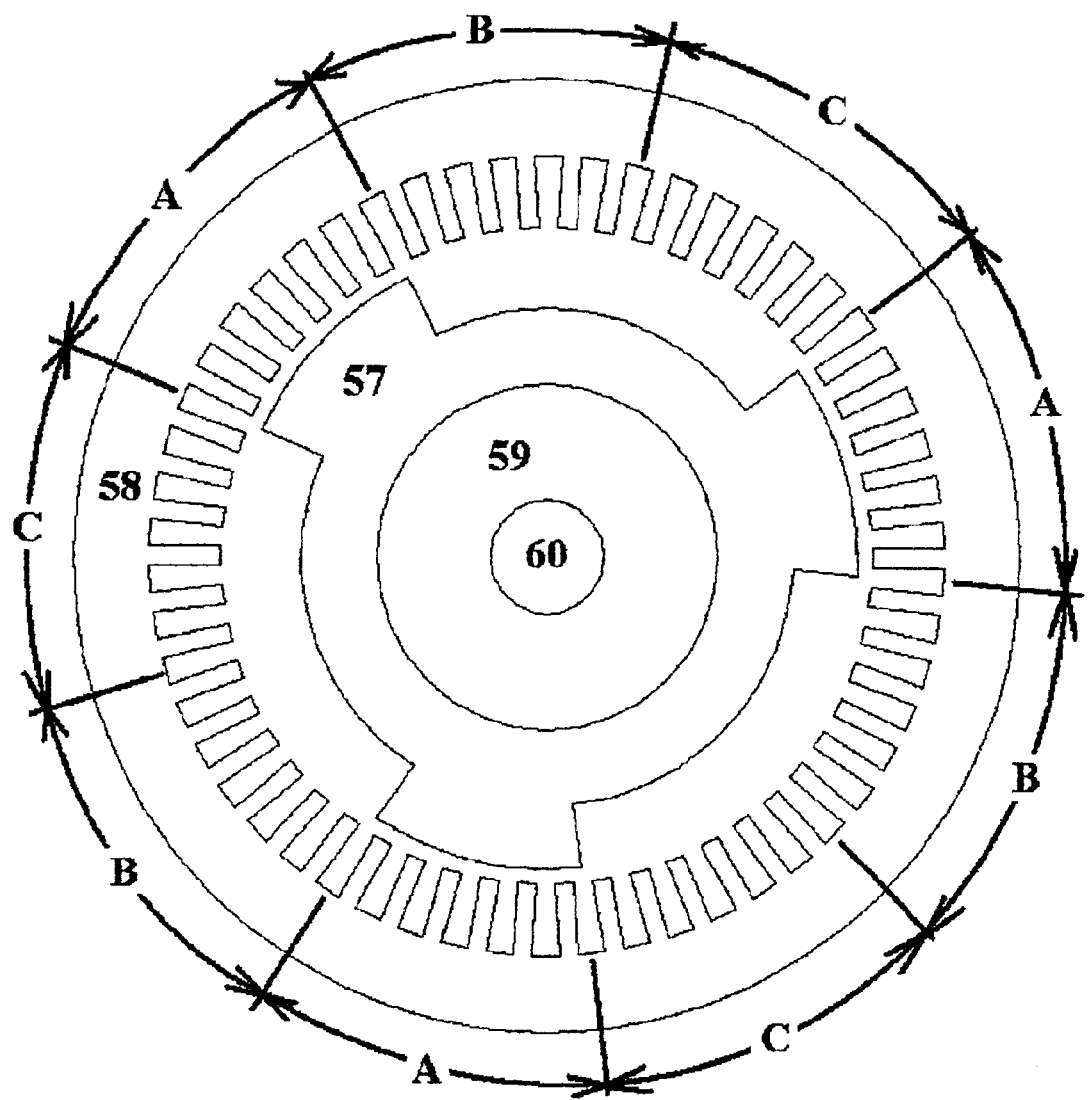
Figure 14:
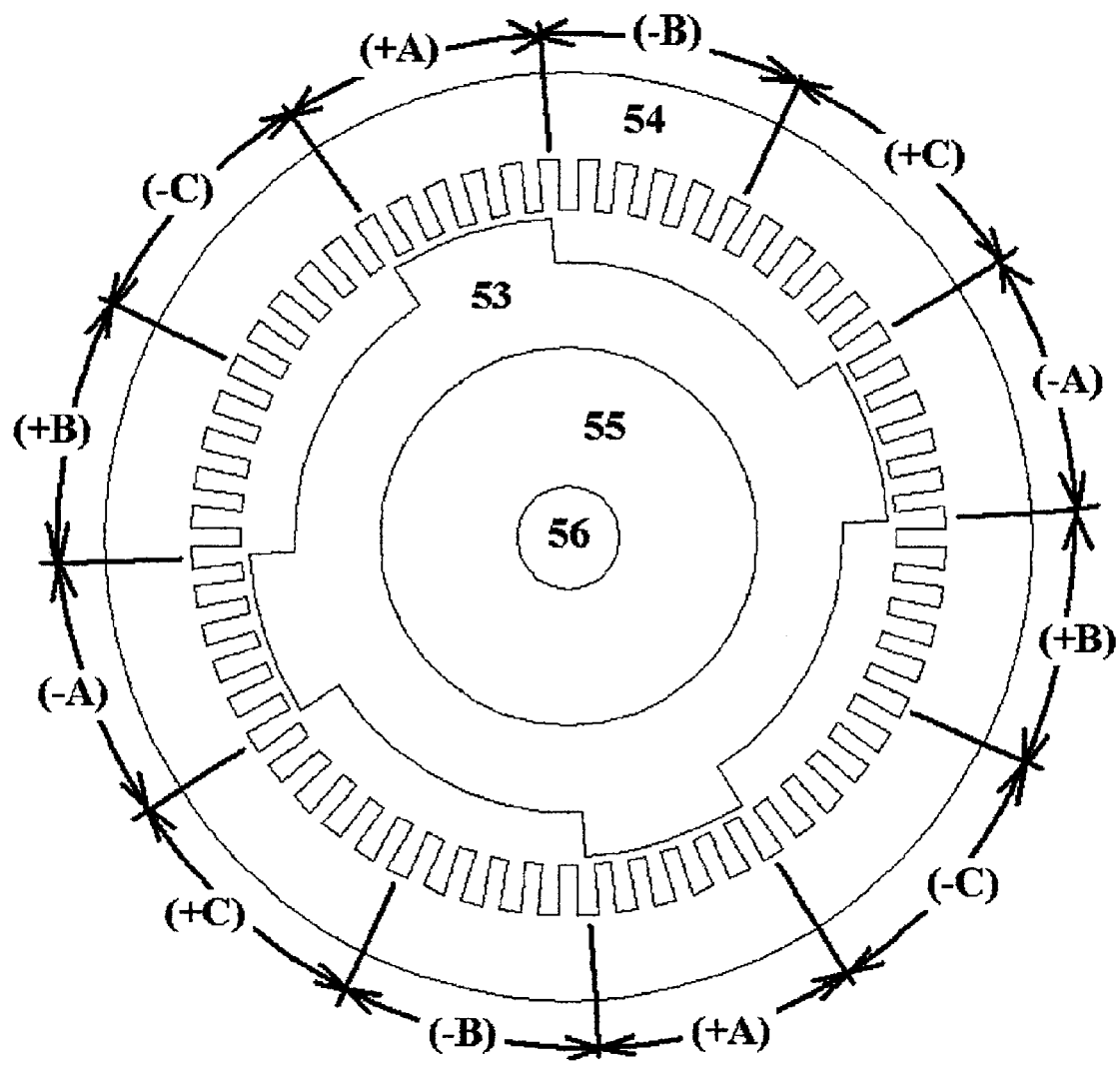

The invention perform a poly-phase machine by using plural poles and plural phases:

A non-overlap-pole type as DC pulse machine, a number of stator teeth per stator pole can be odd or even number but they use in different way of design to configure the motor winding. In case of an odd number of teeth per pole the multi-circular flux loops direction at the both ends of a winding pole are different rotation direction therefore to combine phases between winding poles every winding pole have to invert the phase winding to each other adjacent to eliminate flux cancellation between winding poles (see FIG. 6a). In case of an even number of teeth per pole the multi-circular flux loops direction at the both ends of the winding pole are the same rotation direction therefore to combine phases between winding poles no need to invert the phase winding (see FIG. 6b). The odd number of teeth per stator pole, every winding pole has to invert the phase winding to each other adjacent as FIG. 6a, phase (−a), phase (+B) and phase (−C), respectively. The even number of teeth per stator pole of this winding type does not have to invert the phase winding as FIG. 6b, phase (A), phase (B) and phase (C) for examples in linear motor (FIG. 11c) and in rotating machine (FIG. 12, FIG. 13 and FIG. 14). The motor can be driven by a 3-phase DC pulse source (FIG. 23a).

The best mode of the invention (FIG. 7a and FIG. 7b), the overlap of the phase winding (38, 39) is 1/3 in 3-phase motor (1/4 in 4 phase and 1/5 in 5-phase motor).

An overlap-pole type as DC pulse machine (FIG. 7a) is a winding for a DC pulse motor, having a smooth transition between poles by means of mutual flux between phases with 1/3 overlap winding pole in 3-phase machine. A number of stator teeth in this winding type can be an odd or even number with no limitation of configurations of a number of rotor poles, the invention by this winding can be any number of poles such as 2 poles, 3 poles, 4 poles, 5 poles and 6 poles shown in FIG. 15, FIG. 16, FIG. 17, FIG. 18 and FIG. 19, respectively. The motor can be driven by the 3-phase DC pulse source (FIG. 23b). Increasing a rotor pole width about a half of tooth width of a stator pole to make a smooth rotation of movement between poles by a mutual flux (36 and 37 in FIG. 7a and FIG. 7b) and by overlap excitation between phases produces a low torque ripple.

Figure 7A:
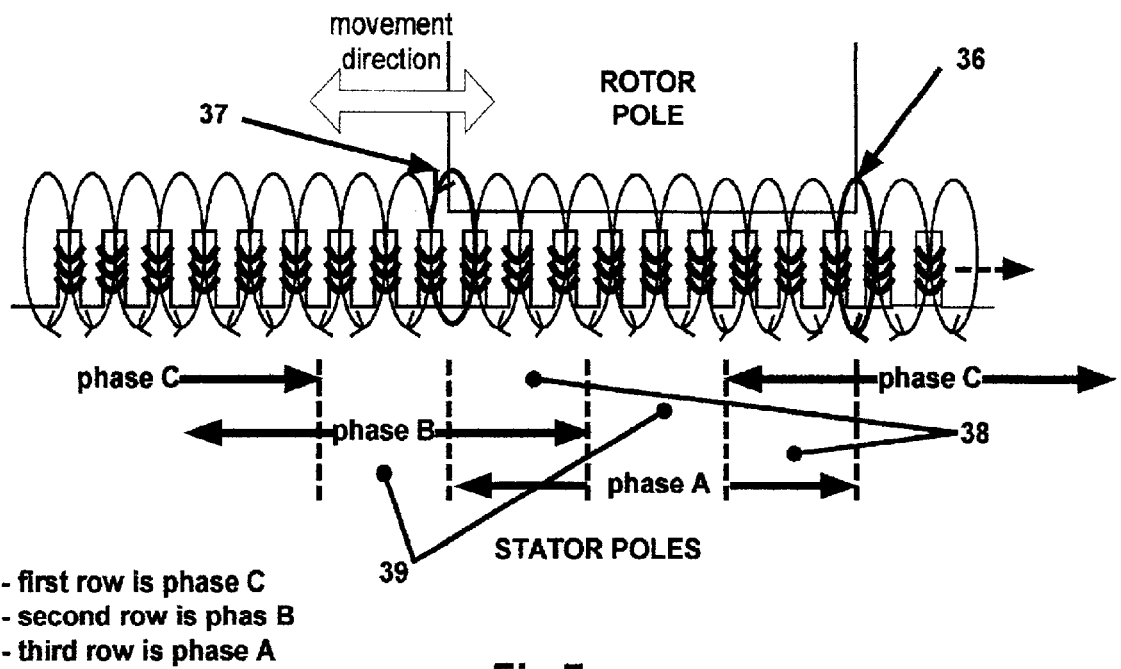
Figure 7B:
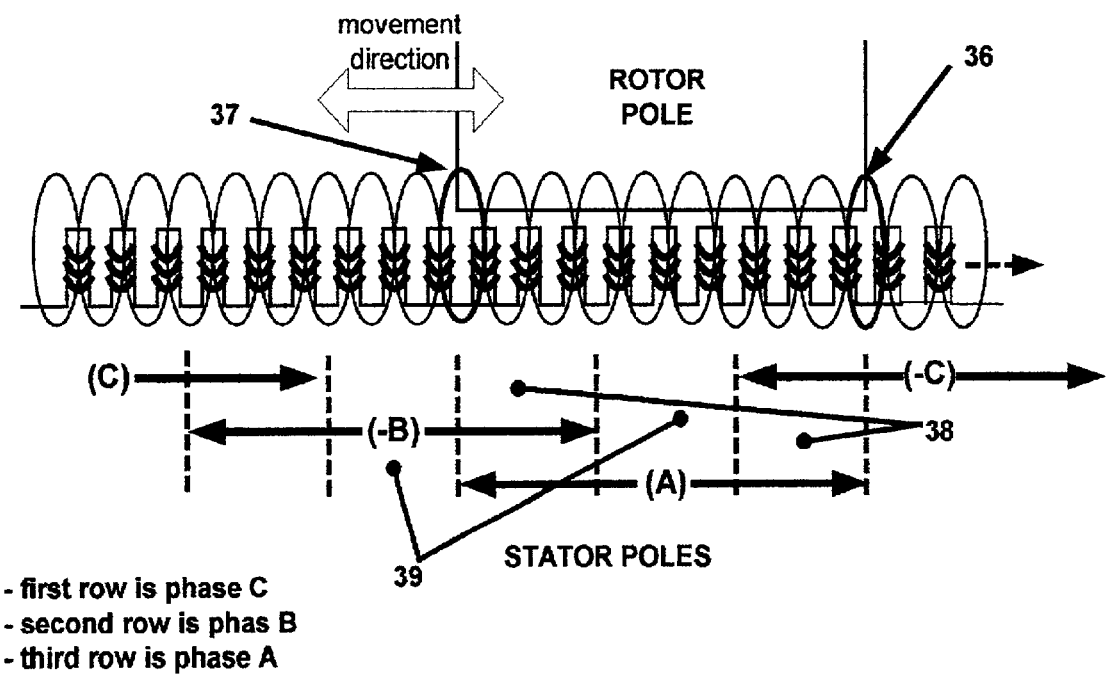

An overlap-pole type as AC machine (FIG. 7b) the circular flux loop rotation direction depends on a polarity of AC source therefore no flux rotation direction are shown in FIG. 7b. The winding for an AC motor, having a smooth transition between poles and by means of mutual flux between phases with 1/3 overlap winding pole in 3-phase machine. A number of stator teeth in this winding type can be only an even number and the invention by this winding can be an even number of poles such as 2 poles, 4 poles and 6 poles shown in FIG. 20, FIG. 21 and FIG. 22, respectively. The invention in this winding type for AC motor every winding pole has to either inversely wound windings or invert the phase winding terminal to each other adjacent to eliminate flux cancellation.

Figure 9A:
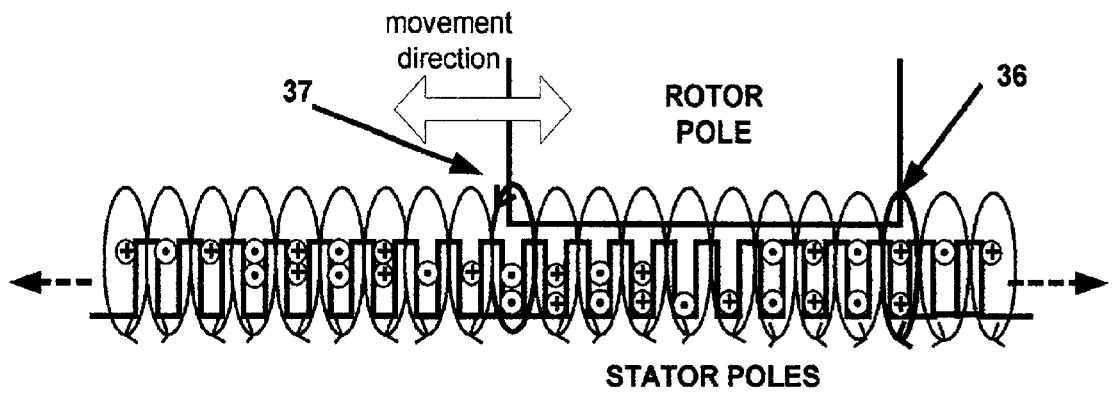
Figure 9B:
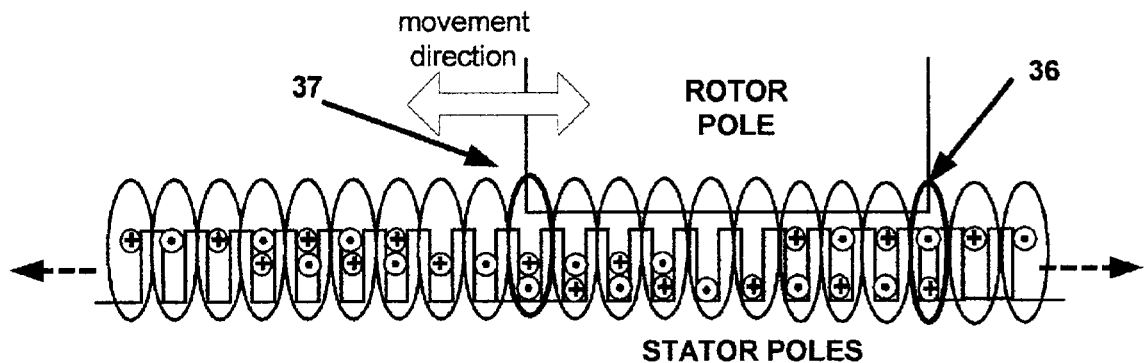

By using RIGHT-HAND-RULE, the circular flux loop rotation direction can be identified to a right rotation or a left rotation direction. In FIG. 9a is simply by wound overlapping with the same current polarity, in FIG. 9b, every winding pole has to invert the phase winding to each other adjacent to eliminate flux cancellation while using alternating current mode (AC machine). At a time that 2 phases of 3-phase voltage have a same polarity (see FIG. 23, (−Vc, −Vb, +Va), (−Vc, +Vb, −Va), (−Vc, +Vb, +Va), (+Vc, −Vb, −Va), (+Vc, −Vb, +Va), (+Vc, +Vb, −Va), (+Vc, +Vb, +Va)) therefore an AC machine every winding pole has to invert the phase winding to each other adjacent in accordance with the alternating current (see examples of invention of AC machine shown in FIG. 20, FIG. 21 and FIG. 22). The phase winding of the machine can be connected together as a star or delta topology and can be driven by a 3-phase AC source (FIG. 23c).

Figure 8A:
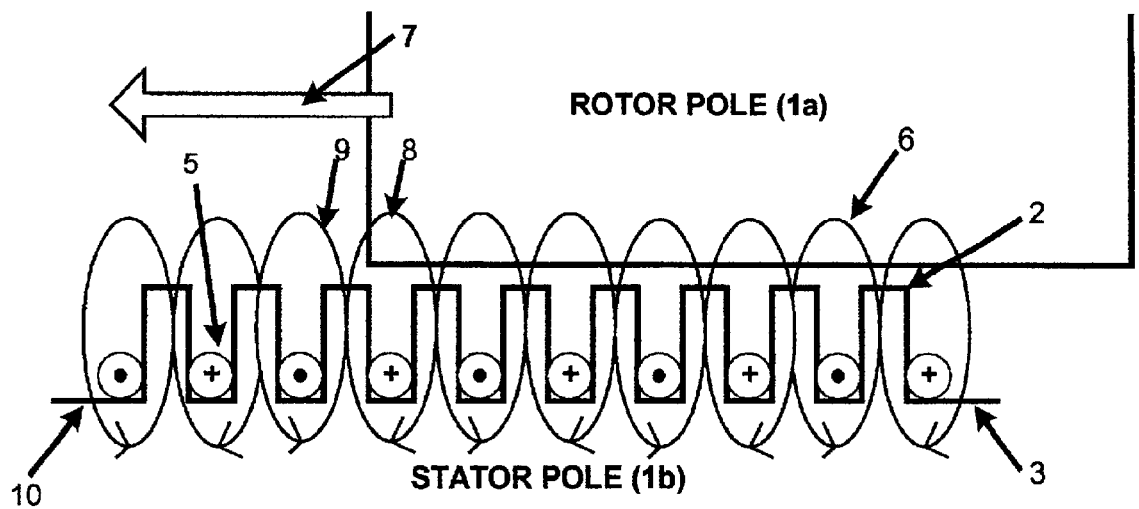
Figure 8B:
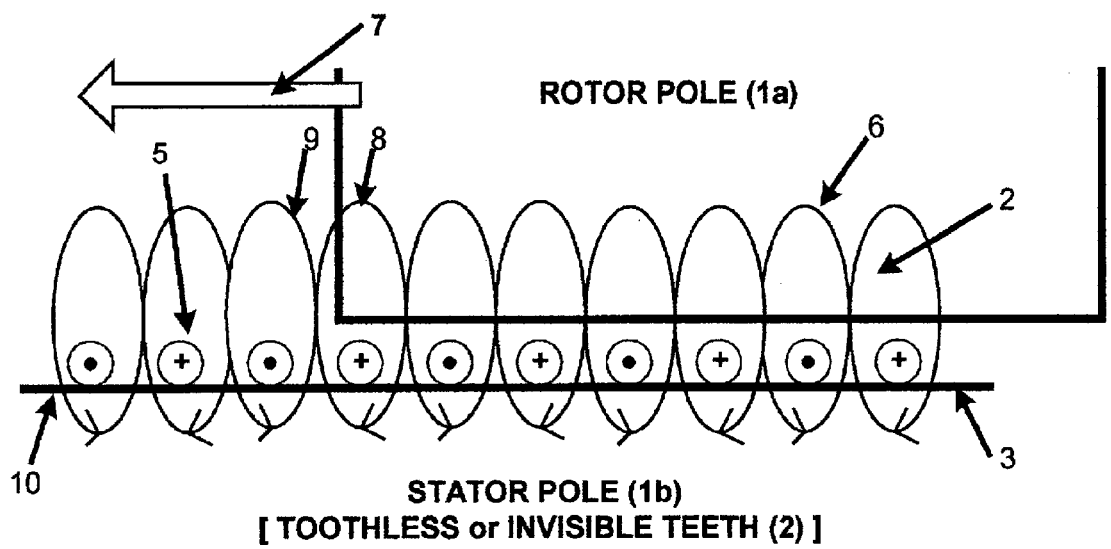

The invention shown in FIG. 2 explains in term of a current direction of the winding related to the multi-circular flux loops rotation direction shown in FIG. 8a and FIG. 8b. All windings are connected together in either a series or parallel to be one phase winding. Every winding in each slot is driven by current inversely direction to each other adjacent. The FIG. 8b is used in some special circumstance such as a need of very small tooth. The invention can work without a tooth on a winding pole but the rotor pole have to be very close to a toothless-stator and the winding space is still necessary to perform as an invisible tooth. An operation of the invention shown in FIG. 8a and FIG. 8b can be explained in the same way as the invention shown in FIG. 2 of the previous part. The 3-phase winding in FIG. 7a and 7b explain in term of a current direction of the winding related to the multi-circular flux loops rotation direction as show in FIG. 9a and FIG. 9b, respectively.

THE INVENTION DETAILED DESCRIPTION

Figure 10:
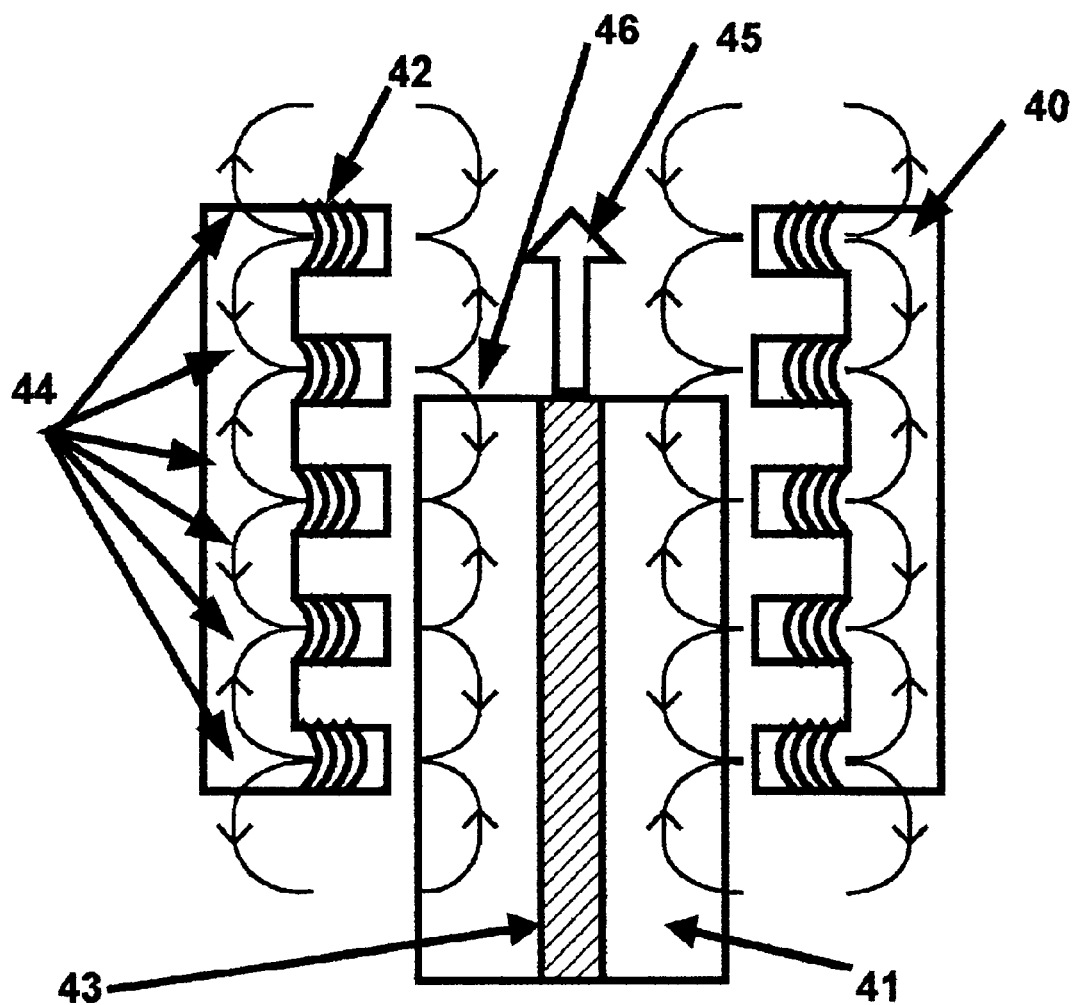

From the simple invention, it can apply in several types of invention such as the linear motor or actuator in FIG. 10. The invention comprised with the stator part (40), the rotor part (41), the windings (42) and rotor support (43). The windings generate multi-circular flux loops (44) and the most effective circular flux loop (46) produces reluctance torque make the rotor or actuator move to direction (45).

To control the movement direction of the invention, at lest has to be a 3-phase machine. The simple invention shown in FIG. 10 can be configured to a 3-phase linear motor as shown in FIG. 11a and FIG. 11b. The linear motor shown in FIG. 11a, having an overlapping and interaction between phases through the rotor body (48) by ratio of 1/3 of the rotor width in the 3-phase machine. For different configuration such as a 4-phase, 5-phase and 6-phase an overlapping are 1/4, 1/5 and 1/6, respectively. The linear motor can use with DC pulse and AC source in the same structure because all winding poles are separated therefore the pole phase excitation can be either +A or −A (47a), +B or −B (47b) and +C or −C (47c). In case of rotating machine to have this capability, the motor has to be a multi-stack motor. Using the overlap-pole type of linear motor, the winding should be located on rail or track. By having winding on the rotor makes the linear motor unbalance of the mutual flux at the both ends of a motor however, it is also possible to do. Using the invention structure shown in FIG. 12 to FIG. 22 by changing structure from rotating to linear movement therefore the invention can apply so widely from a motion control to transportation or traction. In case of the need of simple structure of rail or track therefore the invention shown in FIG. 11a is the most suitable for the rotor winding type.

Figure 11C:
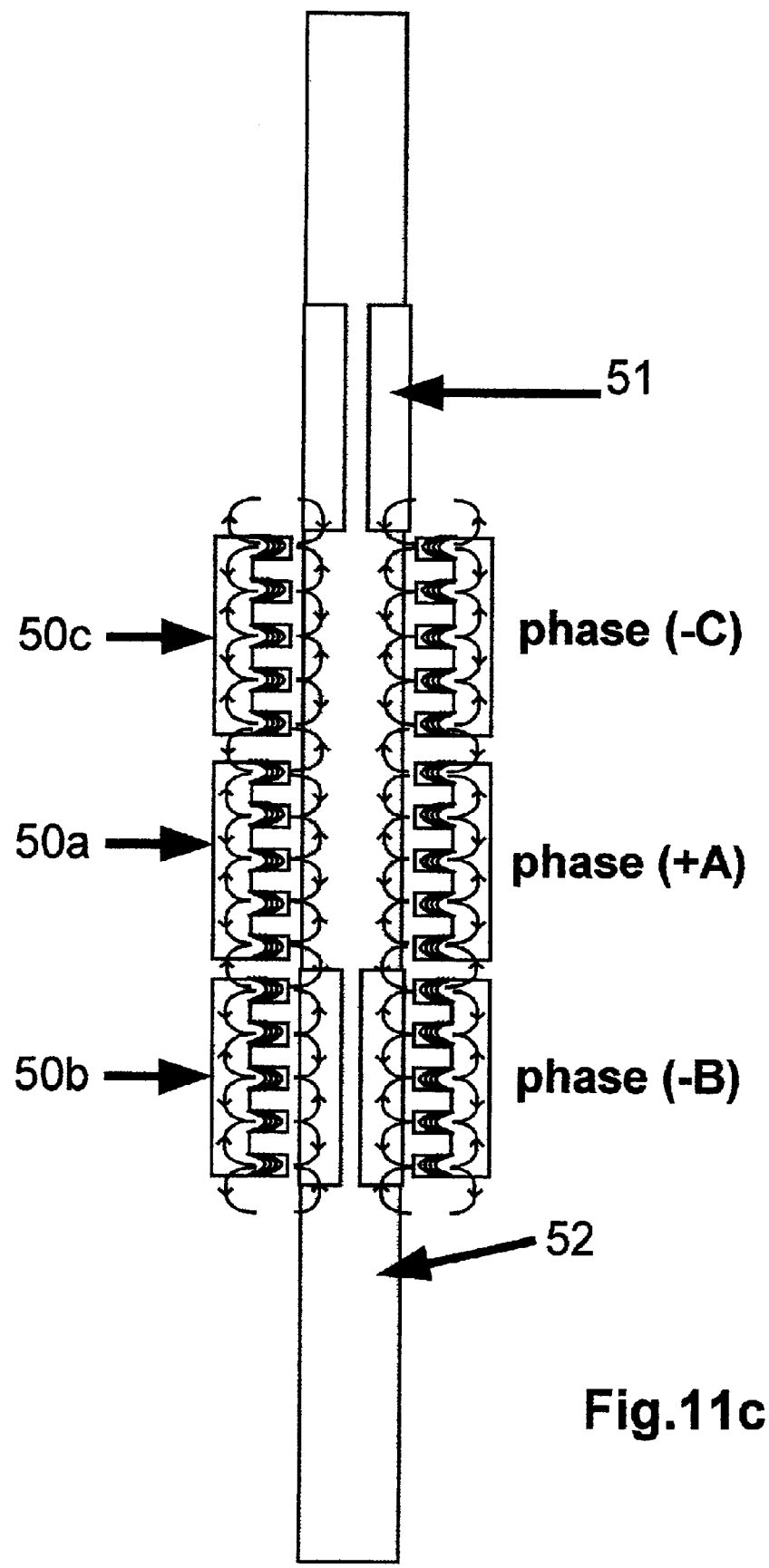

Alternative of invention of linear motor shown in FIG. 11b and FIG. 11c, also a 3-phase linear motor except the motor has no overlapping between the rotor bodies. The invention can be built in two structure choices. The first choice (FIG. 11b) is an old design as the motor shown in FIG. 11d each stator pole can place far from each other about one pole space the pole phase excitation can be either +A or −A (50a), +B or −B (50b) and +C or −C (50c) however, the disadvantage of this configuration is the stator is a long length. The second choice (FIG. 11c) has mutual flux while changing pole to pole that makes the invention move smoother than the first choice. The benefit of the invention shown in FIG. 11b and FIG. 11c has over the invention shown in FIG. 11a when no winding on a rail or track and windings on rotor, uses less stator lamination than the rail or track of the invention show in FIG. 11a, which is the way to make a cheaper rail or track for transportation. In case of a number of teeth per pole at the winding pole is odd number, therefore every winding pole has to invert the phase winding to each other adjacent, for example, +A, −B, and +C (in case of 2-pole rotor therefore phase windings are +A, −B, +C, −A, +B and −C). In case of a number of teeth of the winding pole is even number it no needs to invert the phase winding of invention.

Figure 11D:
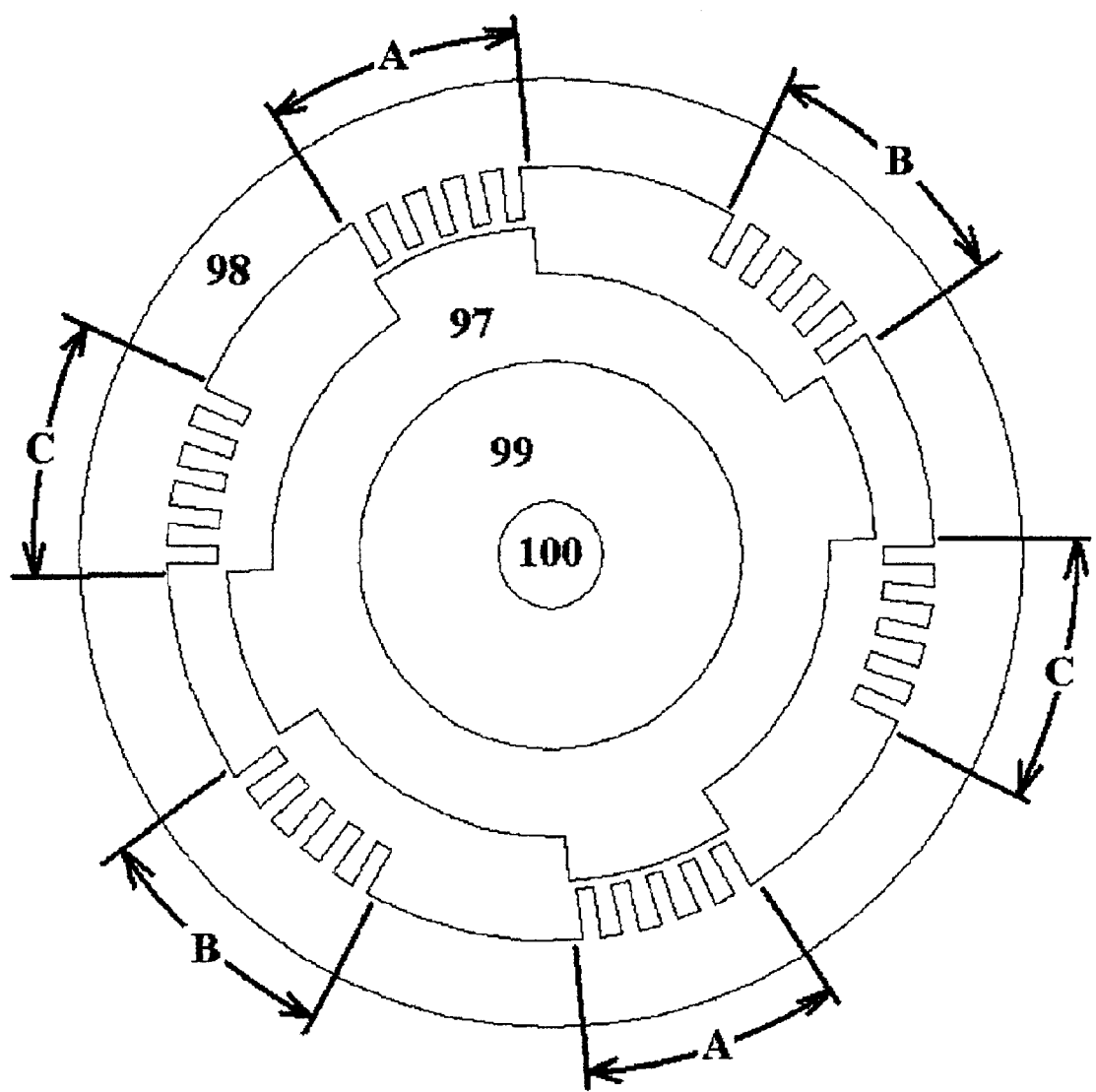

In fact, the invention can configure such as a 6/4 pole 3-phase rotating motor, 8/6 pole 4-phase motor, 10/8 pole 5-phase motor, and 14/12 pole 7-phase motor like a switched reluctance motor by replacing every one pole of each phase with an invention of one pole of FIG. 2, FIG. 3, FIG. 4, FIG. 8a or FIG. 8b. For example, a 3-phase motor with 4 pole rotor, a similar function to a 6/4 pole switched reluctance machine as shown in FIG. 11d, the rotor is rotated by the new method of the invention. In this motor all winding poles are separated by using a series of flux loops of the invention to produce reluctance torque therefore the pole phase excitation can be either (+A) or (−A) in phase A, (+B) or (−B) in phase B, and (+C) or (−C) in phase C. Because an individual of each winding pole, the rotor core can applies a lightweight material or hollows to make low rotor inertia. A number of teeth on winding pole can increases without decreasing a stroke angle therefore making a low torque ripple.

However to get high efficiency of the motor needs to use the new design strategies. By a new design of the invention can apply to an unusual configuration such as a 3 pole 3-phase motor with non-overlap-pole type (FIG. 13), a 3-pole 3-phase motor with overlap-pole type (FIG. 16) and a 5-pole 3-phase motor with overlap-pole type (FIG. 18) with balancing torque structure makes it unique from a switched reluctance motor. A switch reluctance motor needs a large pole space for a winding pole to make unaligned condition with this invention need just only a subdivided tooth space to make unaligned condition therefore the adjacent winding pole of other phases can place next to with a subdivided tooth space in between. Therefore, the ways of motor design of the invention are different from a switched reluctance. Comparison to a conventional switched reluctance motor, for example in 6/4 poles 3-phase motor stroke angle is 30° while the invention configures a 4 poles 3-phase with non-overlap-pole type as shown in FIG. 14 its stroke angle is 30° and get a strong flux because it works with 4 poles at a time. The invention even better than the conventional switched reluctance in term of stroke angle when the overlap-pole is employed for example a 4-pole 3-phase with overlap-pole type as shown in FIG. 17 for DC PULSE and FIG. 21 for AC their stroke angle are 45°.

The Basic Design of Invention

The Non-overlap-pole Type as DC Pulse Machine

The invention by this configuration can be any odd or even number of rotor poles (for examples see FIG. 12, FIG. 13 and FIG. 14, they are 2 poles, 3 poles and 4 poles, respectively). However an indication of odd or even type is that, in case of the number of stator teeth per pole is even number the invention configuration can be even or odd number of rotor poles. In case of the number of stator teeth per pole is odd number the invention configuration can only be an even number of rotor poles and every winding pole has to invert the phase winding to each other adjacent. For example phase windings in 3-phase 2-pole are +A, −B, +C, −A, +B and −C, respectively. To design a motor can be done by following steps.

1. Declare a number of rotor poles.
2. Declare a number of phases.
3. A total number of stator poles=[a number of rotor poles]*[a number of phases].
4. Declare a number of stator teeth per pole.
5. A total number of stator teeth=[A total number of stator poles]*[a number of stator teeth per pole]
6. Minimum teeth per pole for a 3-phase non-overlap-pole type are two teeth to generate a one short flux loop between teeth and two short flux loops at both ends of the multi-circular flux loops. To get a benefit over the invention of a low torque ripple should declare a high number of stator teeth per pole with optimising a practical winding.
7. A stroke angle of the invention=360/a number of poles.
8. A number of windings depend on a selected way of an invention winding (FIG. 2, FIG. 3 and FIG. 4) and a number of stator teeth per pole.

As shown in FIG. 12 the motor is 2-pole rotor, 3 phases and a number of stator teeth per pole are 10 teeth as a result:

A total number of stator poles=2*3=6 poles.

A total number of stator teeth=6*10=60 teeth.

A stroke angle=360/6 =60°.

If selected way of invention windings is the same as FIG. 2 therefore a number of windings=10 teeth per pole (a total number of windings=6*10=60 windings).

As shown in FIG. 13 the motor is 3-pole rotor, 3 phases and a number of stator teeth per pole are 6 teeth as a result:

A total number of stator poles=3*3=9 poles.

A total number of stator teeth=9*6=54 teeth.

A stroke angle=360/9=40°.

If selected way of invention windings is the same as FIG. 2 therefore a number of windings=6 teeth per pole (a total number of windings=9*6=54 windings).

Example of the invention, shown in FIG. 14 the motor is 4-pole rotor, 3 phases and a number of stator teeth per pole are 5 teeth as a result:

A total number of pole=4*3=12 poles.

A total number of stator teeth=12*5=60 teeth.

A stroke angle=360/12=30°.

If selected way of invention windings is the same as FIG. 2 therefore a number of windings=5 teeth per pole (a total number of windings=12*5=60 windings).

The invention has varieties of configurations. The examples of configurations that the invention can be applied are:

A 5-pole 3-phase motor with stroke angle 24°,

A 6-pole 3-phase motor with stroke angle 20°,

A 7-pole 3-phase motor with stroke angle 17.143°,

A 8-pole 3-phase with stroke angle 15°,

A 9-pole 3-phase motor with stroke angle 13.33°,

A 10-pole 3-phase motor with stroke angle 12°,

A 11-pole 3-phase motor with stroke angle 10.09°,

A 12-pole 3-phase with stroke angle 10°,

Etc.

The overlap-pole type as DC pulse machine

The invention by this configuration can be either odd or even number of rotor poles (for examples see FIG. 15, FIG. 16, FIG. 17, FIG. 18 and FIG. 19, they are 2 poles, 3 poles, 4 poles, 5 poles and 6 poles, respectively). The motor can be designed by the following steps.

1. Declare a number of rotor poles.
2. Declare a number of phases.
3. A total number of stator poles=[a number of rotor poles]*[a number of phases].
4. Declare a number of stator teeth per pole. In this case, the invention is an overlap-pole type therefore a number of stator teeth per pole must be in accordance with the overlapping ratio (in 3 phase is 1/3 of pole width, in 4 phase is 1/4 of pole width and in 5 phase is 1/5 of pole width). A result of a number of stator teeth per pole divided by a number of phases should be an integer.
5. Minimum teeth per pole for a 3-phase overlap-pole type are 3 teeth to have 1/3 overlapping among 3 phases). To get a benefit over the invention of a low torque ripple should declare a high number of stator teeth per pole with optimising a practical winding
6. In 3 phases, the number of stator teeth per pole can be any integer number that is multiplied with 3, for examples 3, 6, 9, 12, 15, 18, 21, 24, 27, 30, 33, 36, 39, 42, etc.
7. In 4 phases, the number of stator teeth per pole can be any integer number that is multiplied with 4, for examples 4, 8, 12, 16, 20, 24, 28, 32, 36, 40, etc.
8. A total number of stator teeth=[2/3]*[A total number of stator poles]*[a number of stator teeth per pole].

9. A stroke angle of the invention=360/{[2/3]*[A total number of stator poles]}.
10. A number of windings depend on a selected way of an invention winding (FIG. 2, FIG. 3 and FIG. 4) and a number of stator teeth per pole.

Figure 15:
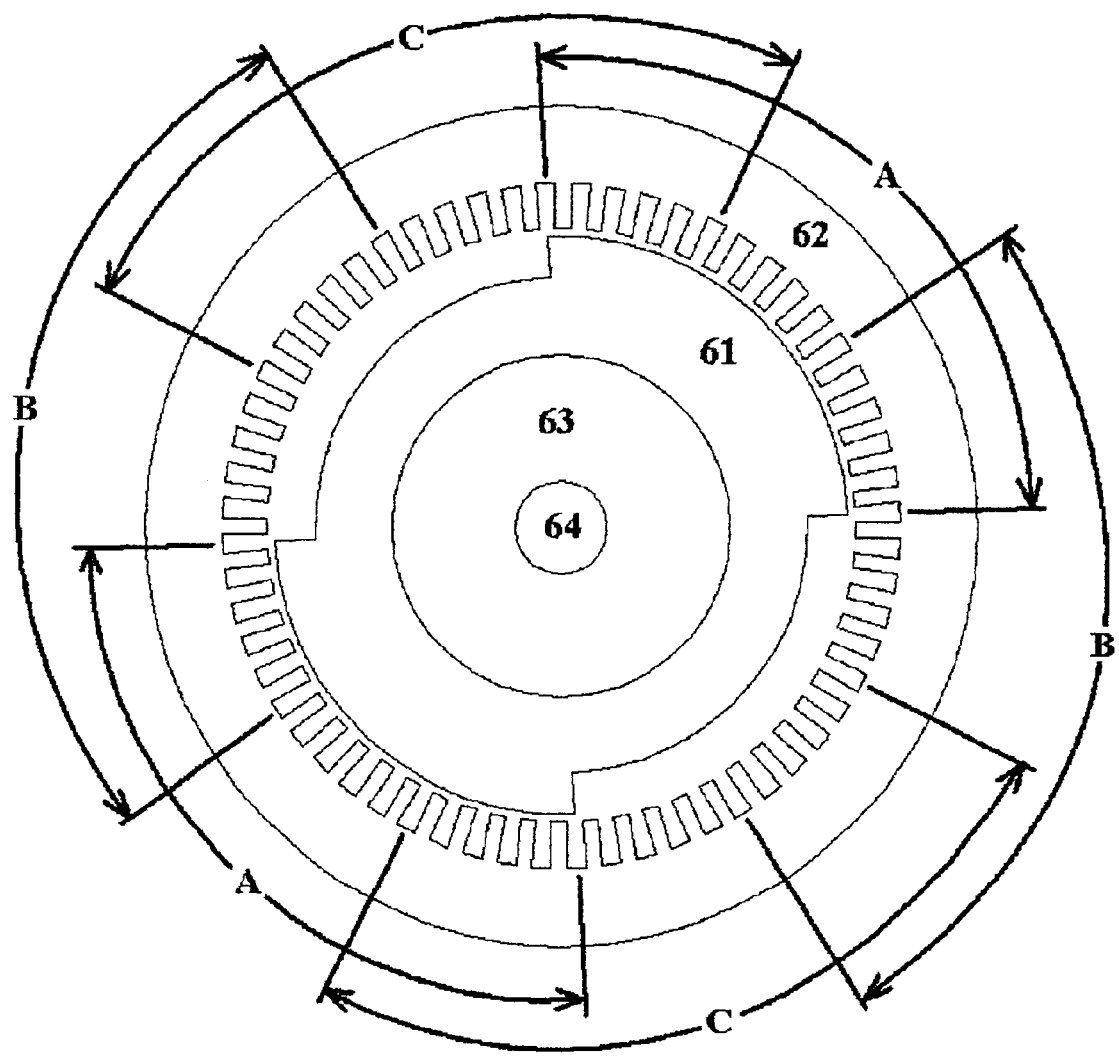

As shown in FIG. 15 the motor is 2-pole rotor, 3 phases and a number of stator teeth per pole are 15 teeth as a result:

A total number of stator poles=2*3 =6 poles.
A total number of stator teeth=[2/3]*6*15=60 teeth.
A stroke angle=360/{[2/3]*[A total number of stator poles]}=360/4=90°.

If selected way of invention windings is the same as FIG. 2,
A total number of windings=[2/3]*6*15=60 windings.

Figure 16:
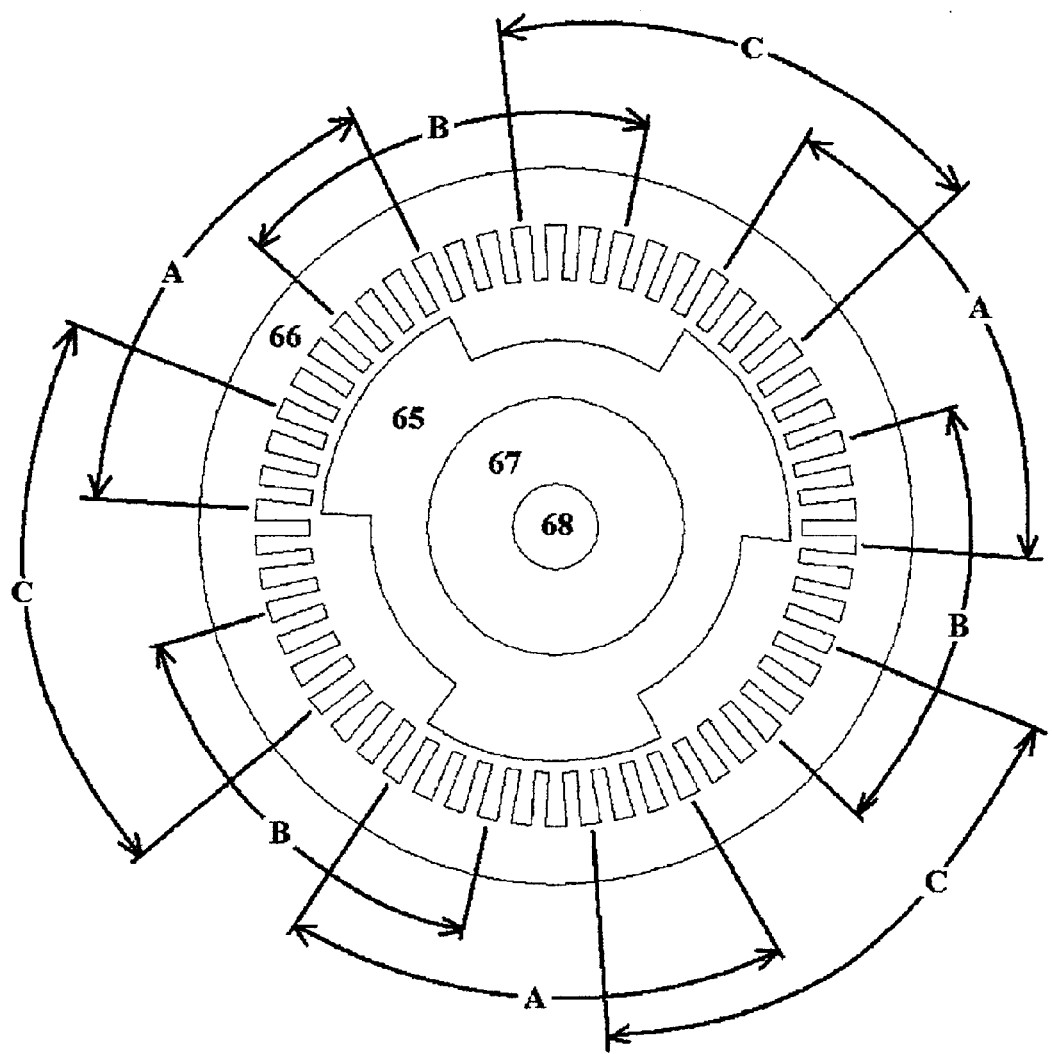
Figure 17:
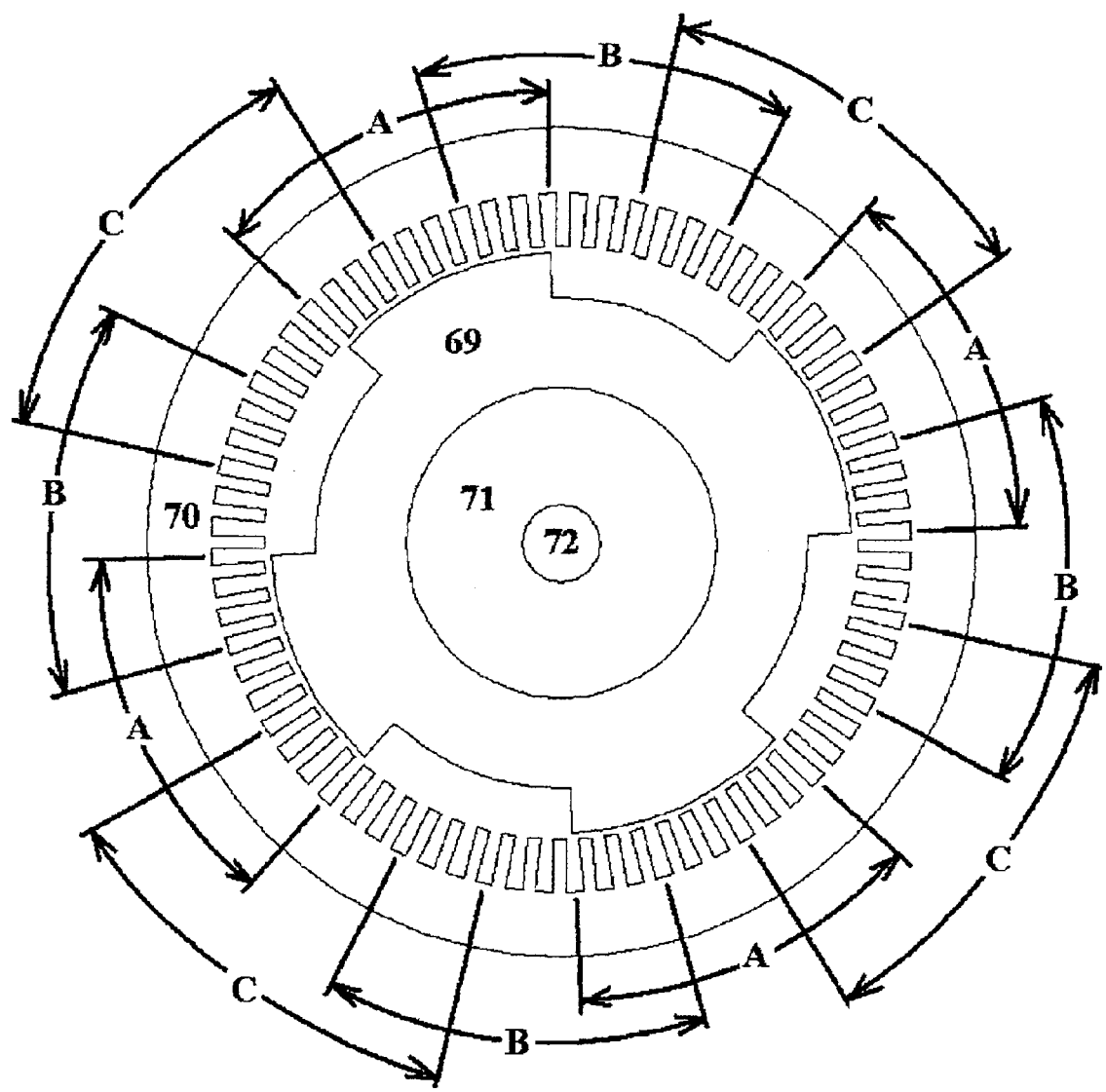

Another examples of the invention structure, in FIG. 16 the motor is 3-pole rotor, 3 phases and a number of stator teeth per pole are 9 teeth as a result:

A total number of stator poles=3*3=9 poles.
A total number of stator teeth=[2/3]*9*9=54 teeth.
A stroke angle=360/{[2/3]*[A total number of stator poles]}=360/6=60°.

If selected way of invention windings is the same as FIG. 2,
A total number of windings=[2/3]*9*9=54 windings.

Figure 18:
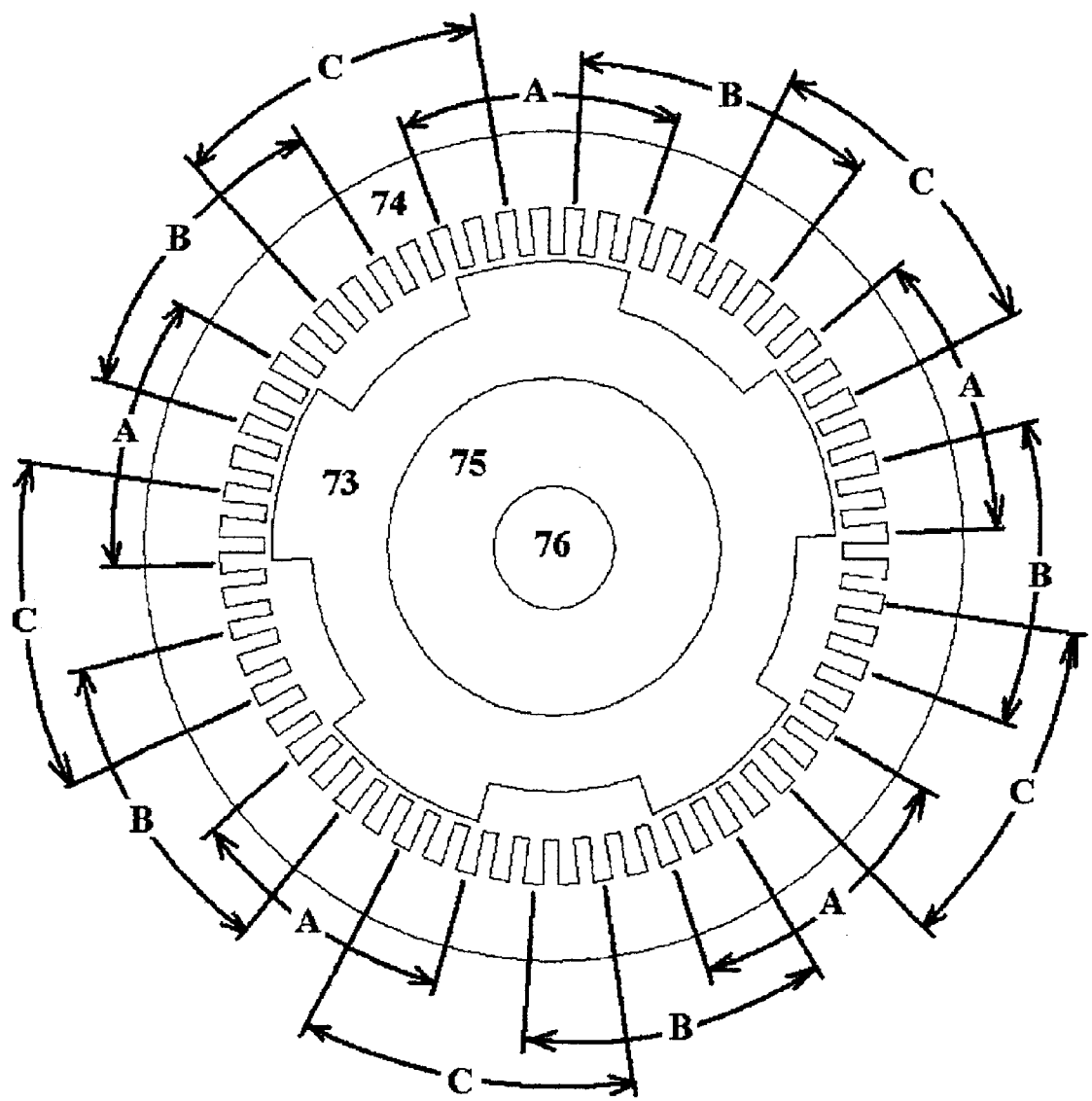
Figure 19:
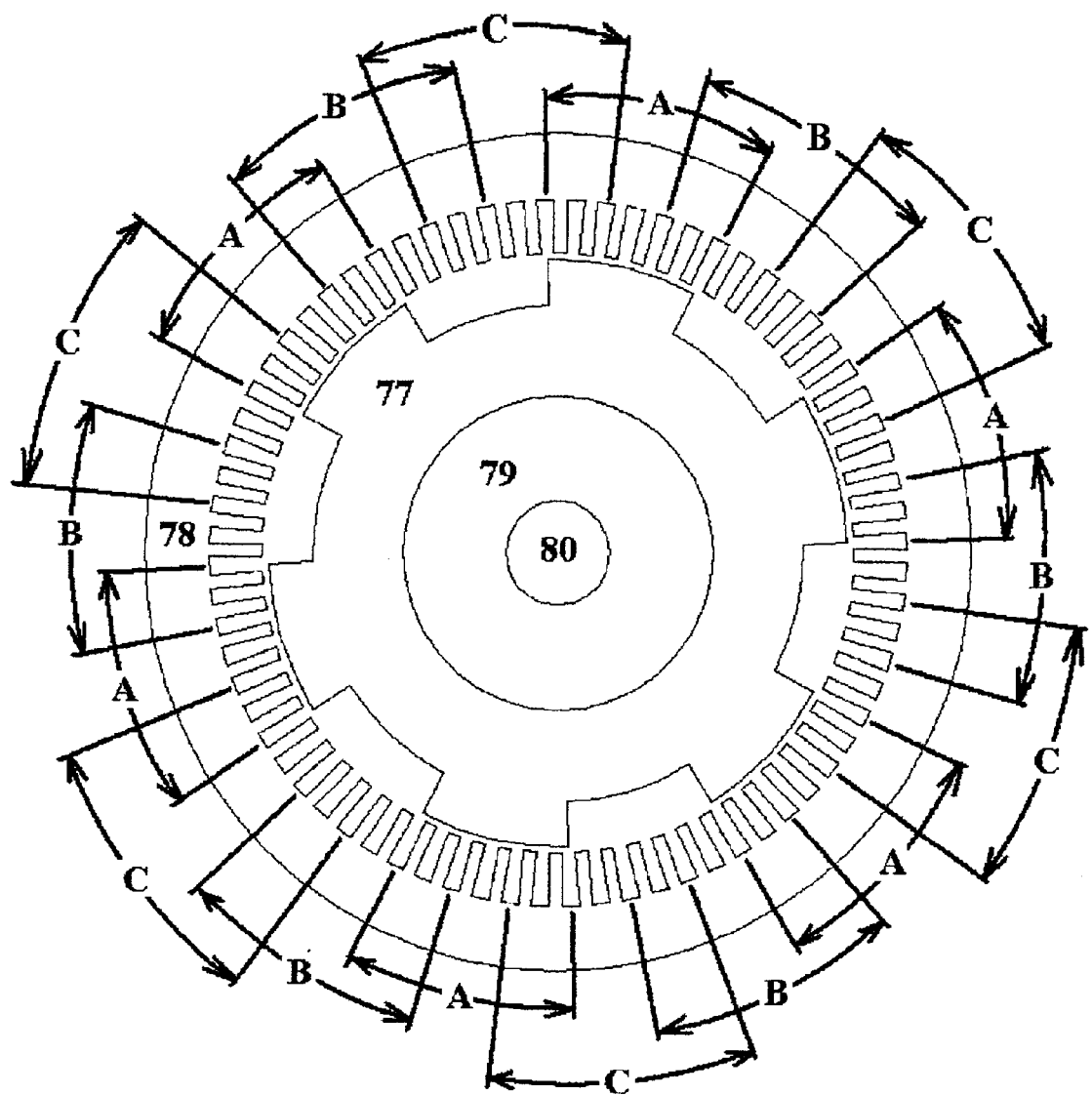

The invention structure has a variety of configuration, as shown:

In FIG. 17 a 4-pole 3-phase motor with stroke angle 45°,
In FIG. 18 a balancing torque 5-pole 3-phase motor with stroke angle 36°,
In FIG. 19 a 6-pole 3-phase motor with stroke angle 30°.

The invention has varieties of configurations. The examples of configurations that the invention can be applied are:

A 7-pole 3-phase motor with stroke angle 25.71°,
A 8-pole 3-phase with stroke angle 22.5°,
A 9-pole 3-phase with stroke angle 20°,
A 10-pole 3-phase with stroke angle 18°,
A 11-pole 3-phase with stroke angle 16.36°,
A 12-pole 3-phase with stroke angle 15°,
Etc.

The Overlap-pole Type as AC Machine

Unlike the switched reluctance motor, the invention structures can apply to the AC motor. However, to design the invention with the overlap-pole type in the AC machine has some limitation of configuration. The invention in overlap winding pole of AC motor, every winding pole has to invert the phase winding to each other adjacent to generate inverse circular flux loop rotation direction to each other adjacent in accordance with an alternating current. In addition, the motor has to use an even number of poles to maintain a balancing torque structure (for examples see FIG. 20, FIG. 21 and FIG. 22, they are 2 poles, 4 poles and 6 poles, respectively). The invention in this configuration can be done by design steps as the overlap-pole type except every winding pole which 1/3 overlapping (in case of the 3-phase motor) are inversely wound the windings or invert the phase winding to each other adjacent (for example, FIG. 20, +A, −B, +C, −A, +B and −C, respectively).

The speed of invention in AC motor can be calculated as a conventional AC motor.

Speed=120[frequency]/[a number of poles]     rpm

The invention by this configuration can be only be an even number of poles of the rotor, for examples 2-pole, 4-pole, 6-pole, 8-pole, 10-pole, 12-pole, etc. The motor can be designed by the following steps:

1. Declare a number of poles of a rotor (only an even number of poles).
2. Declare a number of phases.
3. A total number of stator poles=[a number of rotor poles]*[a number of phases].
4. Declare a number of stator teeth per pole. In this case, the invention is an overlap-pole type therefore a number of stator teeth per pole must be in accordance with the overlapping ratio (in 3 phase is 1/3 of pole width, in 4 phase is 1/4 of pole width and in 5 phase is 1/5 of pole width). A result of a number of stator teeth per pole divided by a number of phases should be an integer.
5. Minimum teeth per pole for a 3-phase overlap-pole type are three teeth to have 1/3 overlapping among 3 phases).
6. In 3 phases, the number of stator teeth per pole can be declared in any integer number that is multiplied with 3, for examples 3, 6, 9, 12, 15, 18, 21, 24, 27, 30, 33, 36, 39, 42, etc.
7. In 4 phases, the number of stator teeth per pole can be declare is any integer number that is multiplied with 4, for examples 4, 8, 12, 16, 20, 24, 28, 32, 36, 40, etc.
8. To get a benefit over the invention of a low torque ripple should declare a high number of stator teeth per pole with optimising a practical winding.
9. A total number of stator teeth=[2/3]*[A total number of stator poles]*[a number of stator teeth per pole].
10. A stroke angle of the invention=360/{[2/3]*[A total number of stator poles]}.
11. A number of windings depend on a selected way of an invention winding and a number of stator teeth per pole.
12. The invention in overlap winding pole of AC motor, every winding pole has to invert the phase winding to each other adjacent (to generate inverse circular flux loop rotation direction to each other adjacent) to be in accordance with alternating current, for example phase windings in 3-phase 2-pole are +A, −B, +C, −A, +B and −C, respectively.

The invention has varieties of configurations. The examples of configurations that the invention can be applied are:

A 2-pole 3-phase motor with a stroke angle 90°,
A 4-pole 3-phase motor with a stroke angle 45°,
A 6-pole 3-phase motor with a stroke angle 30°,
A 8-pole 3-phase with a stroke angle 22.5°,
A 10-pole 3-phase with a stroke angle 18°,
A 12-pole 3-phase with a stroke angle 15°,
Etc.

DRAWING DESCRIPTION OF THE INVENTION

FIG. 1: A flux density of one phase excitation (Prior Art)
FIG. 2: A simple one pole of the invention (Every tooth of a stator pole are wound), all windings are connected together and are one phase excitation
FIG. 3: A simple one pole of the invention (Every odd tooth of a stator pole are wound), all windings are connected together and are one phase excitation
FIG. 4: A simple one pole of the invention (Every even tooth of a stator pole are wound), all windings are connected together and are one phase excitation
FIG. 5: A torque profile of the invention compare to a prior art: torque of 9 teeth (31); total torque (32); prior art torque (33)

Figure 6A:
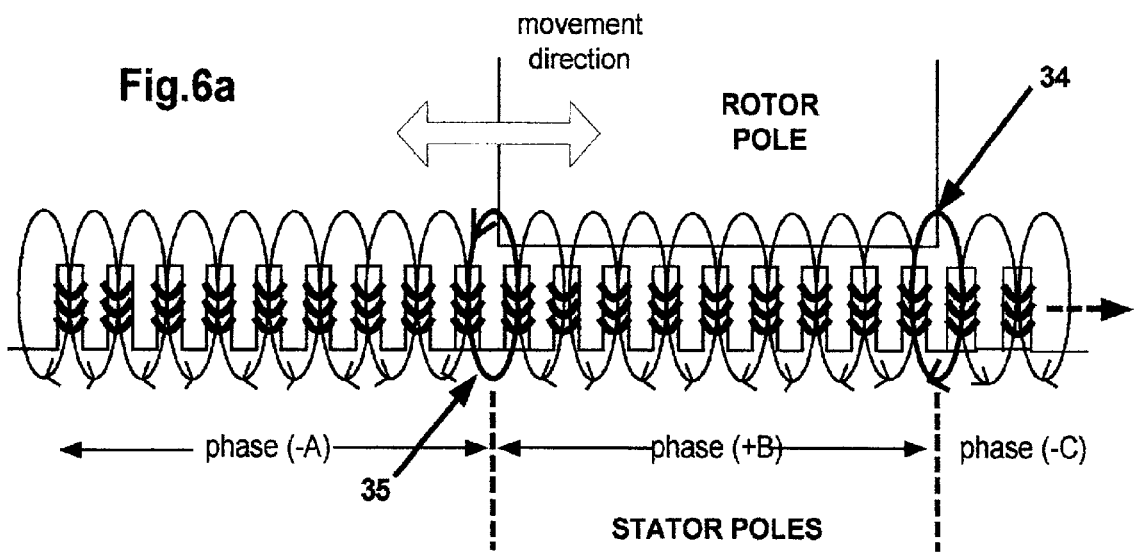

FIG. 6a: A simple 3-phase of the invention (non-overlap-pole type): configuration for an odd number of stator teeth per pole (9 teeth)

Figure 6B:
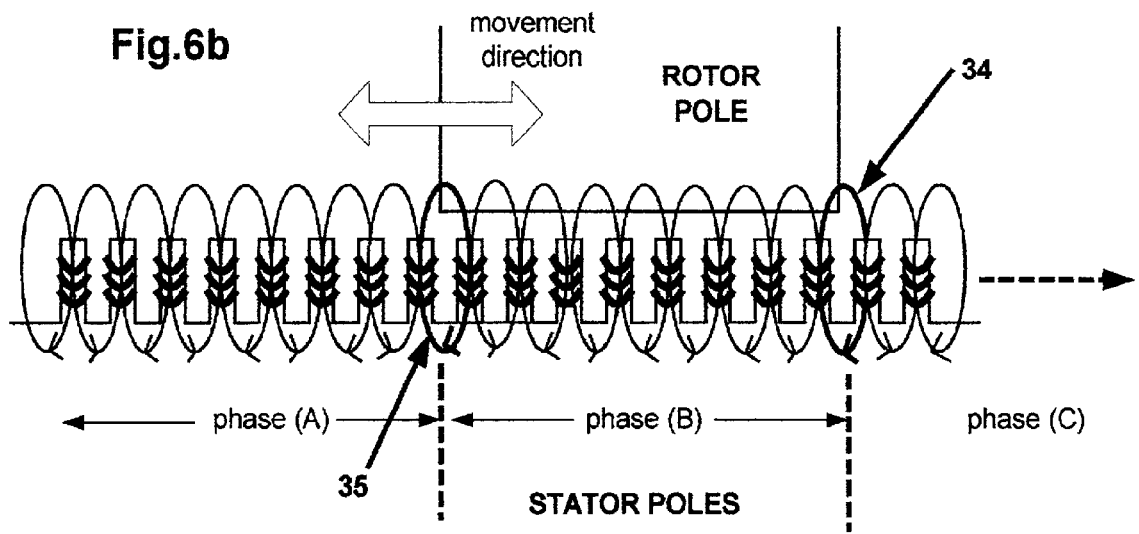

FIG. 6b: A simple 3-phase of the invention (non-overlap-pole type): configuration for an even number of stator teeth per pole (8 teeth)

FIG. 7a: the best mode of the invention, an overlap-pole type as DC PULSE machine, each phase are separated and some teeth have more than one phase FIG. 7b: the best mode of the invention, an overlap-pole type as AC machine, each phase are separated and some teeth have more than one phase FIG. 8a: The current direction of the winding related to the multi-circular flux loops rotation direction, all windings are connected together and are one phase excitation FIG. 8b: The invention in term of a toothless-stator machine, all windings are connected together and are one phase excitation FIG. 9a: The 3-phase DC pulse motor: each phase are separated and some slot have more than one phase; first row is phase C; second row is phase B; third row is phase A FIG. 9b: The 3-phase AC motor: each phase are separated and some slot have more than one phase; first row is phase C; second row is phase B; third row is phase A.

FIG. 10: The simple invention in a term of a linear motor: 2 stator/rotor sets (40), a 1 phase winding, 5 teeth with windings per pole (42), 1 rotor/stator pole (41), the multi-circular flux loops (44), the most effective circular flux (46) and a direction of movement (45). All flux rotation direction create by winding are inverse to each other adjacent.

FIG. 11a: A 3-phase motor with non-overlap-pole type, a phase A (47a), a phase B (47b), a phase C (47c), a rotor/stator (48) and a rotor/stator support (49).

FIG. 11b: A 3-phase motor with non-overlap-pole type with a pole space, a phase A (50a), a phase B (50b), a phase C (50c), a rotor/stator (51) and a rotor/stator support (52).

FIG. 11c: A 3-phase motor with non-overlap-pole type without a pole space, a phase A (50a), a phase B (50b), a phase C (50c), a rotor/stator (51) and a rotor/stator support (52). NOTE: In case of a number of stator teeth per pole are even number, there are no inverse phase winding.

FIG. 11d: A 3-phase motor with 4-pole rotor (97), similar function to a 6/4-pole switched reluctance motor, 5 teeth with winding per pole, stator frame (98), motor shaft (100) and rotor core (99).

FIG. 12: A 2-pole (93), a 3-phase motor with non-overlap-pole type, 10 winding teeth with windings per pole, stator frame (94), motor shaft (96) and rotor core (95)

FIG. 13: A 3-pole (57), a 3-phase motor with non-overlap-pole type, 6 teeth with windings per pole, stator frame (58), motor shaft (60) and rotor core (59)

FIG. 14: A 4-pole (53), a 3-phase motor with non-overlap-pole type, 5 teeth with windings per pole, stator frame (54), motor shaft (56) and rotor core (55)

FIG. 15: A 2-pole (61), a 3-phase DC pulse motor with overlap-pole type, 15 teeth with windings per pole, stator frame (62), motor shaft (64) and rotor core (63)

FIG. 16: A 3-pole (65), a 3-phase DC pulse motor with overlap-pole type, 9 teeth with windings per pole, stator frame (66), motor shaft (68) and rotor core (67)

FIG. 17: A 4-pole (69), a 3-phase DC pulse motor with overlap-pole type, 9 teeth with windings per pole, stator frame (70), motor shaft (72) and rotor core (71)

FIG. 18: A 5-pole (73), a 3-phase DC pulse motor with overlap-pole type, 6 teeth with windings per pole, stator frame (74), motor shaft (76) and rotor core (75)

FIG. 19: A 6-pole (77), a 3-phase DC pulse motor with overlap-pole type, 6 teeth with windings per pole, stator frame (78), motor shaft (80) and rotor core (79)

Figure 20:
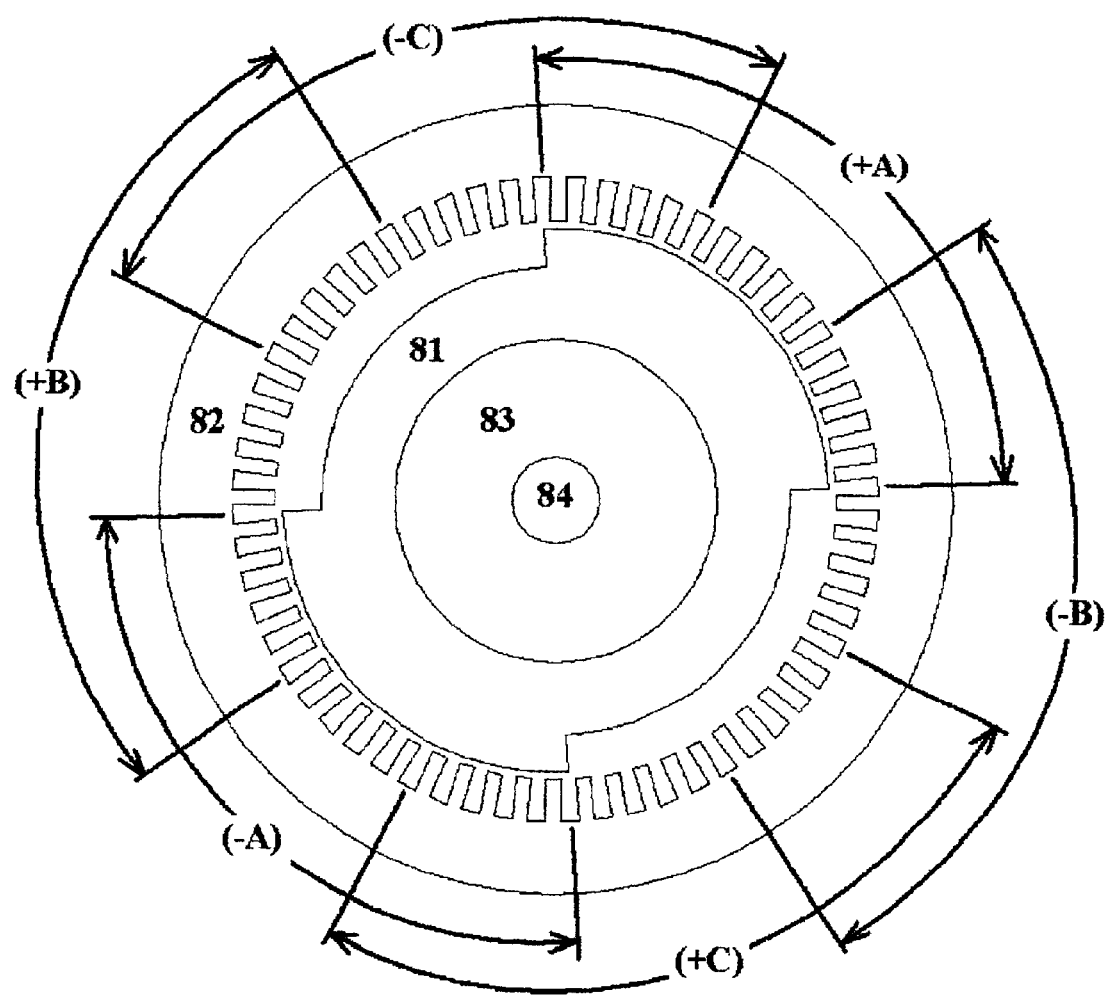

FIG. 20: A 2-pole (81), a 3-phase AC motor with overlap-pole type, 15 teeth with windings per pole, stator frame (82), motor shaft (84) and rotor core (83)

Figure 21:
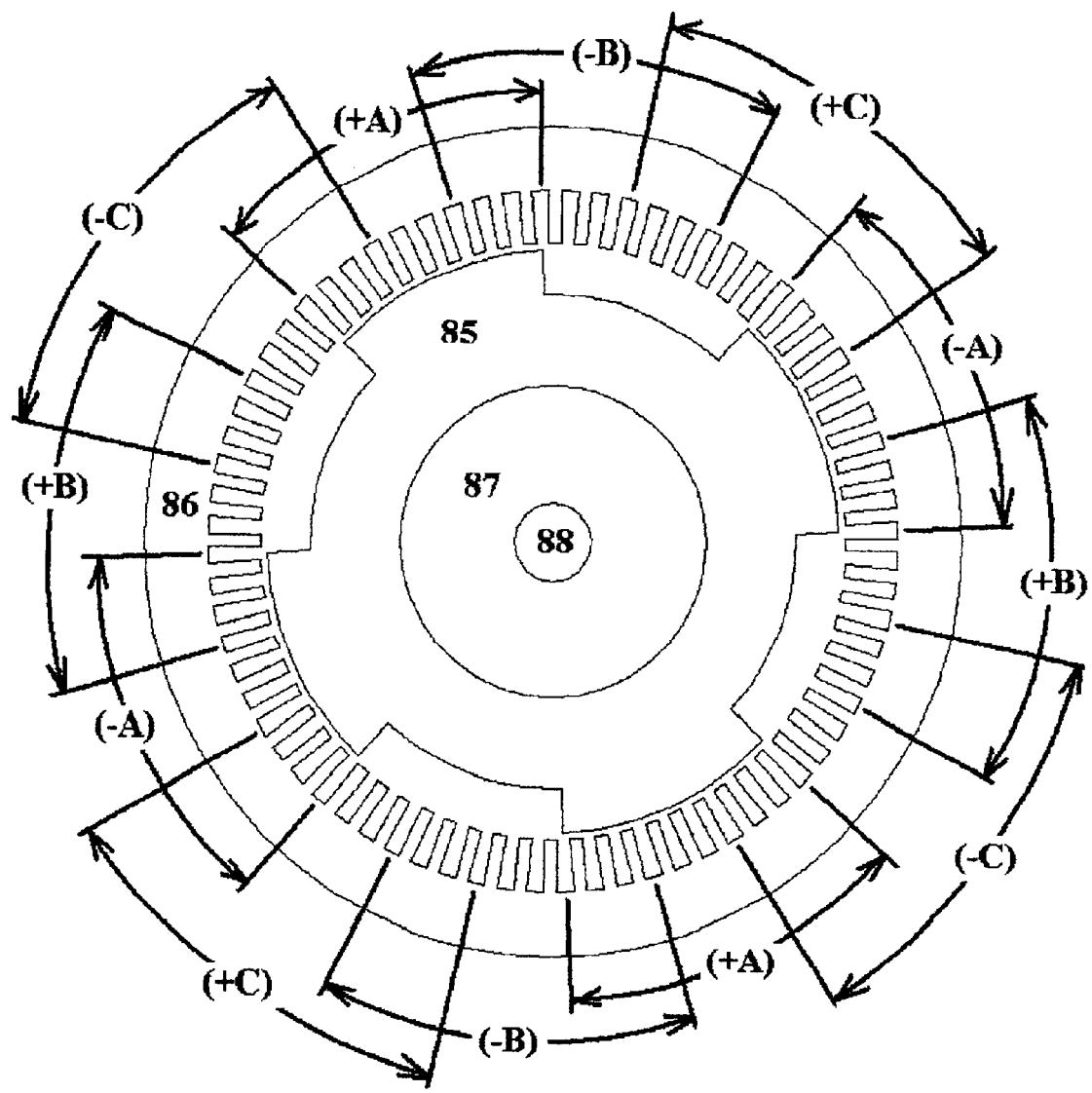

FIG. 21: A 4 poles (85), a 3-phase AC motor with overlap-pole type, 9 teeth with windings per pole, stator frame (86), motor shaft (88) and motor core (87)

Figure 22:
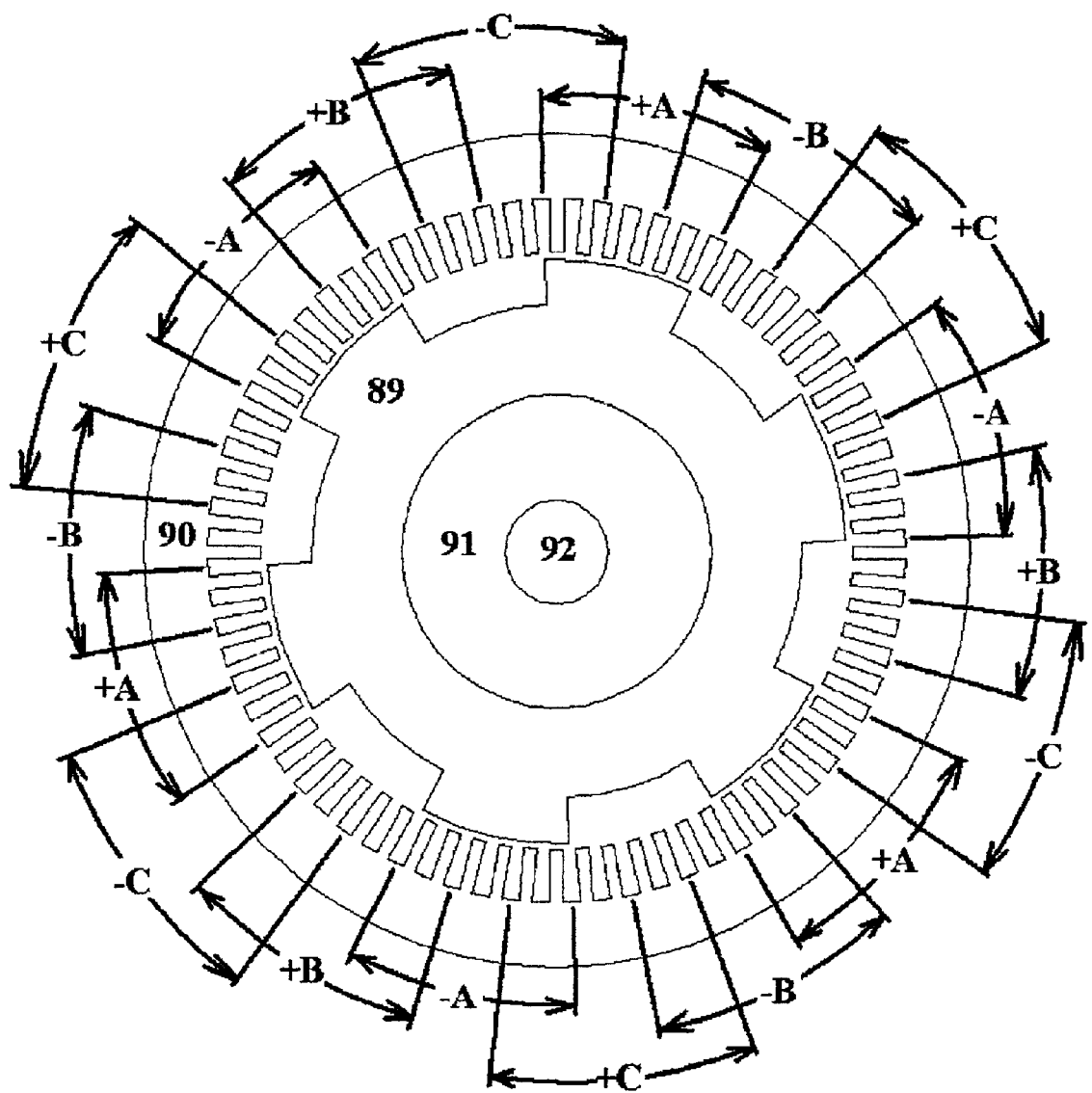
Figure 23:
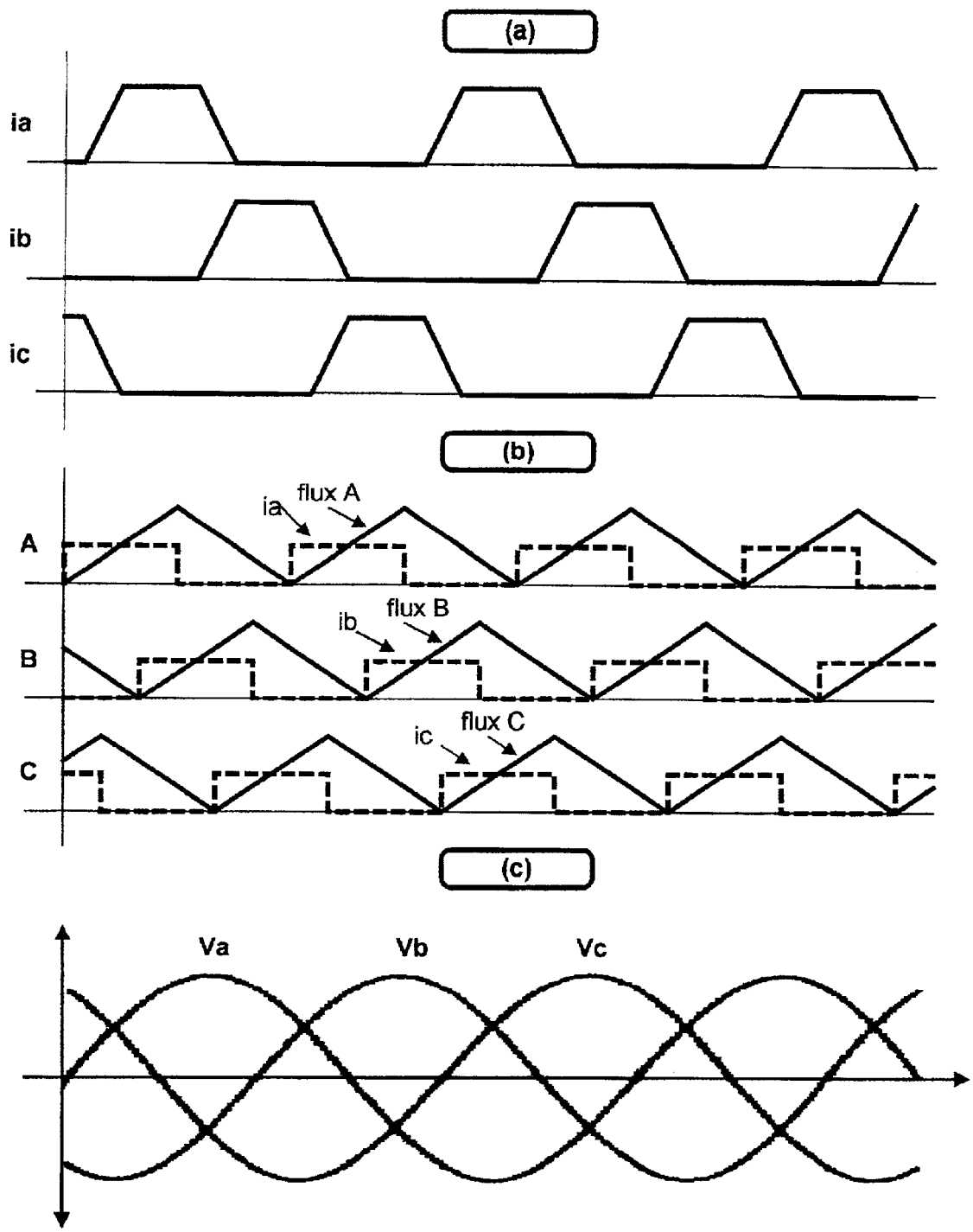

FIG. 22: A 6 poles (89), a 3-phase AC motor with overlap-pole type, 6 teeth with windings per pole, stator frame (90), motor shaft (92) and motor core (91)

FIG. 23: The waveform for the invention: (a) A waveform for a 3-phase non-overlap-pole type (DC pulse machine); (b) A waveform for a 3-phase overlap-pole type (DC pulse machine); (c) A waveform for a 3-phase overlap-pole type (AC machine)

*Please note that the motor core may not be necessary if the design circumstance does not concern about torque per weight therefore the motor core can be the rotor lamination area.

I claim:

1. A polyphase reluctance machine comprising:
   a first and second magnetic circuit assemblies arranged for relatively movement;
   said first magnetic assembly having a plurality of first salient poles
   said second magnetic assembly having a plurality of second salient poles;
   wherein
      widths of said first and second salient poles being substantially equal; and,
      only said plurality of first salient poles carrying windings, each of said first salient poles of said first assembly is subdivided into plural teeth;
      the windings for each of said first salient poles being mounted on either each of said teeth or on alternate teeth thereof, and all said windings of said teeth of each of said first salient poles being connected together to be one phase winding such that, when excited, a phase winding of each pole forms electromagnetic poles of same polarity, each wound tooth being arranged, when in use, generating left and right circular flux loops such that a rotational direction of flux loop linkings to portions of on of a right loop and a left flux loop of respective adjacent wound teeth to be the same, and said flux loop linkings joining together as a series of circular flux loops, and an arrangement of said first and said second magnetic assemblies such that, when said machine being in used, at a position of a pole corner of said second salient poles of said second magnetic assembly is in alignment with said first salient poles of said first magnetic assembly, a flux loop produces a reluctance torque to move said salient poles, wherein said pole-corner of the second assembly being sequentially increasingly aligned with the pole of the first assembly by subsequent flux loops producing reluctance torque to continue move until said first and said second salient poles of said first and second assemblies are fully aligned.

2. Said polyphase reluctance machine as claimed in claim 1 constructed as a non-overlap-pole machine, wherein said first salient pole of an adjacent phase and the first salient pole of a present phase have their respective wound teeth arranged such that respective end flux loops of each series of flux loops are in the same rotation direction at said first salient poles that joint between phases.

3. Said polyphase reluctance machine as claimed in claim 1 constructed as an overlap-pole machine such that the winding poles of plural phases are in part overlapped, wherein respective series of flux loops of each overlapping pole section are in the same rotation direction.

4. Said polyphase reluctance machine as claimed in claim 1, said first magnetic assembly comprises a stator.

5. Said polyphase reluctance machine as claimed in any of claim 1, wherein the first magnetic assembly comprises a rotor.

6. Said polyphase reluctance machine as claimed in claim 4 or claim 5 wherein, when said machine being in use, the windings in each slot are driven by current inversely direction to windings in adjacent slots.

7. Said polyphase reluctance machine as claimed in claim 4, wherein said windings of the plural teeth of each of said first salient poles are connected together to be one phase winding, said one-phase windings being connected in parallel.

8. Said polyphase reluctance machine as claimed in claim 4, wherein said windings of the plural teeth of each of said first salient poles are connected together to be one phase winding, said one-phase windings being connected in series.

9. Said polyphase reluctance machine as claimed in claim 7 or 8 wherein windings of adjacent teeth of each of said first salient poles being wound inversely direction to each other.

10. Said polyphase reluctance machine as claimed in claim 7 or 8 wherein only odd teeth of each of said first salient poles, being wound by windings, and said odd teeth being wound in the same direction.

11. Said polyphase reluctance machine as claimed in claim 7 or 8, wherein only even teeth of each of said first salient poles, being wound by windings, and said odd teeth being wound in the same direction.

12. Said polyphase reluctance machine as claimed in claim 4 or claim 5 wherein said teeth being virtual teeth, said virtual teeth is defined by a configuration of said first salient poles to form tooth-less salient poles, wherein position of the winding on the first magnetic assembly being maintained so as to effect each of the virtual teeth for flux traveling between the first salient poles and the second salient poles.

13. Said polyphase reluctance machine as claimed in claim 2, said first magnetic assembly comprises a stator.

14. Said polyphase reluctance machine as claimed in any of claim 2, wherein the first magnetic assembly comprises a rotor.

15. Said polyphase reluctance machine as claimed in claim 13 or 14, wherein said machine being a direct-current pulse polyphase reluctance machine comprising at least two second salient poles, a predetermined number of phases and each of said first salient poles having an even number of teeth, said direct current pulse polyphase reluctance machine having parameters:
    (a) a total number of first salient poles is equal to a product of a number of second salient poles multiplied by the predetermined number of phases; and,
    (b) a total number of teeth equals a product of a number of toothed-poles of said first salient poles multiplied by a number of said teeth per said first poles.

16. Said polyphase reluctance machine as claimed in claim 13 or 14, wherein said machine being a direct-current pulse polyphase reluctance machine comprising an even number of said second salient poles and each of said first salient poles having at least two teeth thereof, and a predetermined number of phase, said direct current pulse polyphase reluctance machine having parameters:
    (a) a total number of first salient poles is equal to a product of a number of second salient poles multiplied by the predetermined number of phases; and,
    (b) a total number of teeth equals a product of a number of toothed-poles of said first salient poles multiplied by a number of said teeth per said first poles.

17. Said polyphase reluctance machine as claimed in claim 15 or 16 having three phases, the machine parameters including:
    a stroke angle of the machine equals 360 divided by 2/3 of a total number of first magnetic assembly poles.

18. Said polyphase reluctance machine as claimed in claim 3, said first magnetic assembly comprises a stator.

19. Said polyphase reluctance machine as claimed in any of claim 3, wherein the first magnetic assembly comprises a rotor.

20. Said polyphase reluctance machine as claimed in claim 18 or 19 comprising a direct current pulse machine comprising at least two second salient poles, a predetermined number of phases and each of said first salient poles having an even number of teeth, said direct current pulse polyphase reluctance machine having parameters:
    (a) a total number of first salient poles is equal to a product of a number of second salient poles multiplied by the predetermined number of phases; and,
    (b) a total number of teeth equals a product of a number of toothed-poles of said first salient poles multiplied by a number of said teeth per said first poles.

21. Said polyphase reluctance machine as claimed in claim 20, wherein said predetermined number of phases is three and the machine parameters including: the total number of teeth equal 2/3 of the total number of stator poles times the number of teeth per pole; and the stroke angle of the machine equals 360 degrees divided by 2/3 of the total number of first magnetic assembly poles.

22. Said polyphase reluctance machine as claimed in claim 18 or 19 being a direct-current pulse polyphase reluctance machine comprising an even number of said second salient poles and each of said first salient poles having at least two teeth thereof, and a predetermined number of phase, said direct current pulse polyphase reluctance machine having parameters:
    (a) a total number of first salient poles is equal to a product of a number of second salient poles multiplied by the predetermined number of phases; and,
    (b) a number of teeth of each said first salient pole divided by a number of phases is an integer, every winding pole having the phase winding inverted with respect to each adjacent pole to generate series of flux loops rotation direction in accordance with alternating current to eliminate cancellation of the series of flux loops.

23. Said polyphase reluctance machine as claimed in claim 22 having a three
    phases, the machine parameters including: a total number of teeth equals 2/3 of a total number of said first salient poles multiplies a number of teeth per pole; and a stoke angle of the machine equal 360 degrees divided by 2/3 of the a number of first salient poles.

24. Said polyphase reluctance machine as claimed in any one of claims 15 to 23 where in order to achieve low torque ripple the winding is optimized to provide for a high number of teeth.

25. Said polyphase reluctance machine as claimed in any one of claims 15 to 23 comprising a linear motor.

26. Said polyphase reluctance machine as claimed in claim 4 where the rotor core comprises a light weight material.

27. Said polyphase reluctance machine as claimed in claim 4 where the rotor core comprises hollowed out.

* * * * *